US012764186B1

(12) United States Patent
Schneider

(10) Patent No.: US 12,764,186 B1
(45) Date of Patent: Oct. 13, 2026

(54) SYSTEM, METHOD, PRODUCT, AND APPARATUS FOR DECENTRALIZED STATE MANAGEMENT VIA SELF-TERMINATING TRANSIENT PAYLOADS

(71) Applicant: Eric Schneider, Hallandale Beach, FL (US)

(72) Inventor: Eric Schneider, Hallandale Beach, FL (US)

( * ) Notice: Subject to any disclaimer, the term of this patent is extended or adjusted under 35 U.S.C. 154(b) by 0 days.

(21) Appl. No.: 19/652,876

(22) Filed: Apr. 20, 2026

(51) Int. Cl.
*H04L 67/1095* (2022.01)
*H04L 9/00* (2022.01)

(52) U.S. Cl.
CPC ............ *H04L 67/1095* (2013.01); *H04L 9/50* (2022.05)

(58) Field of Classification Search
CPC .......................................................... H04L 9/50
See application file for complete search history.

(56) References Cited

U.S. PATENT DOCUMENTS 11,232,098 B2 1/2022 Yu et al.
11,258,586 B2 2/2022 Xie
11,315,110 B2 4/2022 Jayachandran et al.
11,544,044 B2 1/2023 Liu
11,627,003 B2 4/2023 Biyani
11,934,888 B2 3/2024 Muskal et al.
12,067,539 B2 8/2024 Mallik et al.
2020/0042971 A1 2/2020 Eby et al.
2021/0012282 A1 * 1/2021 Smith ................ G06Q 10/0838
2024/0005315 A1 1/2024 Agunloye
2024/0372731 A1 * 11/2024 Kobel ..................... H04L 9/008
2025/0226998 A1 * 7/2025 Kaplan ..................... H04L 9/50
2025/0267150 A1 * 8/2025 Soryal ................... H04L 63/105

OTHER PUBLICATIONS

Eric Schneider; "System, Method, Product, and Apparatus for Latent Decentralized State Transitions Via Deterministically Mapped Instruction Sets"; Unpublished U.S. Appl. No. 19/658,578, filed Apr. 26, 2026.

* cited by examiner

*Primary Examiner* — Hee Soo Kim

(57) ABSTRACT

A system and method for decentralized state management facilitate state-optimized data transfers by utilizing a transient instruction set to manage the operational lifecycle of data objects. The system comprises a payload generator configured to assemble a payload containing a state unit and a transient instruction set. This instruction set includes the specific execution logic required to instantiate a temporary coordinate, adjust the state unit through that coordinate, and trigger a mandatory de-allocation of the temporary coordinate from a persistent state. A communication interface broadcasts the payload to a decentralized data structure, ensuring that the instantiation, adjustment, and de-allocation are coupled as a single atomic update. This synchronized sequence within one transaction cycle prevents permanent state bloat and ensures that network resources are reclaimed immediately following utilization, providing an automated economic incentive for ledger cleanliness and operational security across decentralized environments.

30 Claims, 14 Drawing Sheets

SYSTEM, METHOD, PRODUCT, AND APPARATUS FOR DECENTRALIZED STATE MANAGEMENT VIA SELF-TERMINATING TRANSIENT PAYLOADS

FIELD OF THE DISCLOSURE

The present disclosure relates generally to decentralized network protocols and the management of data within distributed ledger architectures. More specifically, the disclosure relates to systems and methods for executing atomic state updates via self-terminating payloads that instantiate and de-allocate temporary coordinates within a single transaction cycle.

BACKGROUND OF THE DISCLOSURE

The management of state within decentralized environments is constrained by a fundamental divergence between persistence requirements and resource efficiency. Distributed ledger architectures prioritize the permanent storage of every state transition to ensure historical auditability, creating a structural dependency on ever-expanding data sets. This commitment to total persistence imposes an inherent trade-off between the integrity of the network and the scalability of the physical storage layer.

The current technical landscape exists as a fragmented collection of disparate disciplines, each operating within localized logical constraints that do not coalesce into a unified solution. Distributed database management focuses on high-availability and long-term storage but remains tethered to a cumulative data model that does not account for the lifecycle of intermediate variables. Cryptographic addressing schemes provide secure routing but are typically static, resulting in state bloat as addresses remain active long after their functional utility has expired. Concurrent execution environments attempt to parallelize logic, yet they face physical latency constraints when managing state conflicts across globally synchronized ledgers. Furthermore, cross-chain messaging protocols facilitate data portability between heterogeneous structures but leave residual data artifacts on multiple chains, compounding the storage burden.

A functional deficit exists between these approaches. The combination of persistent storage models and static addressing results in a system where the data required to facilitate a complex transaction becomes a permanent burden on every node in the network. Even when these fields are integrated, the resulting architecture lacks a mechanism to distinguish between a final state result and the temporary coordinates required to reach that result. Consequently, the decentralized data structure treats every intermediate step of a state transition with the same degree of permanence as the final output, leading to a degradation of network performance and a ceiling on transaction velocity imposed by the physical limits of persistent state storage.

Accordingly, in light of the above, there is a need for a technical framework capable of managing state transitions through the use of functionally transient data structures that reconcile the requirements of cryptographic finality with the necessity of automated resource reclamation.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY OF THE DISCLOSURE

The present disclosure introduces a technical framework for optimizing the data footprint of decentralized ledgers by decoupling immediate state transitions from long-term storage requirements. The described systems and methods are directed to the technical challenges associated with data persistence and state bloat in decentralized network environments. By introducing a mechanism for the creation and automated reclamation of short-lived data structures, the systems and methods described herein enable high-velocity state transitions that minimize the long-term storage footprint on a distributed ledger. This architecture further enables the secure origination and sequestration of state units through verified authorization sources, ensuring that even the creation or initial isolation of assets is governed by the same transience protocols. This approach facilitates a more efficient utilization of network resources by ensuring that intermediate data used to facilitate a transaction does not remain as a permanent artifact of the decentralized data structure.

At the core of this disclosure is a novel architecture for coordinating atomic updates through the use of self-terminating payloads. These payloads are engineered to exist in a state of functional transience, where the addresses and logic required to modify a state unit are instantiated, utilized, and purged within the boundary of a single atomic transaction. This lifecycle management prevents the accumulation of unnecessary data at the network's persistent storage layer while maintaining the cryptographic integrity and security required for decentralized consensus. Through the use of latent state anchors and provenance records, the disclosure provides a mechanism for verifying the legitimacy of transient logic and its resulting state adjustments long after the associated bytecode has been de-allocated. Through the integration of deterministic coordinate derivation and automated de-allocation logic, the disclosed embodiments provide a scalable solution for complex, multi-step state transitions across both homogeneous and heterogeneous data structures.

In one aspect of the present disclosure a system for decentralized state management includes a payload generator configured to assemble a payload comprising a state unit and a transient instruction set. The transient instruction set includes execution logic to instantiate a temporary coordinate adjust the state unit via the temporary coordinate and trigger a de-allocation of the temporary coordinate from a persistent state. The system further includes a communication interface to broadcast the payload to a decentralized data structure wherein the payload is configured to require the instantiation adjustment and de-allocation to occur within a single atomic update of the decentralized data structure.

In another aspect of the present disclosure a system for decentralized state management includes a processor and a memory storing instructions that when executed by the processor configure the system to assemble a payload comprising a state unit and a transient instruction set. The instructions configure the transient instruction set to instantiate a temporary coordinate adjust the state unit via the temporary coordinate and trigger a de-allocation of the temporary coordinate from a persistent state. The system is further configured to broadcast the payload to a decentralized data structure whereby the payload is configured to require the instantiation adjustment and de-allocation to occur within a single atomic update of the decentralized data structure.

In a further aspect of the present disclosure a system for state-optimized data transfer includes a processor and a memory storing an execution engine that when executed by the processor configures the system to output a payload comprising a state unit and a transient instruction set. The execution engine configures the transient instruction set to instantiate a temporary coordinate adjust the state unit via the temporary coordinate and trigger a de-allocation of the temporary coordinate from a persistent state. The system includes a network interface to broadcast the payload to a decentralized data structure whereby the execution engine is configured to trigger the instantiation adjustment and de-allocation within a single atomic update of the decentralized data structure.

In another aspect of the present disclosure a non-transitory computer-readable medium stores instructions that when executed by a processor configure the processor to assemble a payload comprising a state unit and a transient instruction set. The instructions configure the transient instruction set to instantiate a temporary coordinate adjust the state unit via the temporary coordinate and trigger a de-allocation of the temporary coordinate from a persistent state. The instructions further configure the processor to broadcast the payload to a decentralized data structure whereby the payload is configured to require the instantiation adjustment and de-allocation to occur within a single atomic update of the decentralized data structure.

In a further aspect of the present disclosure a method for managing transient state in a decentralized data structure includes constructing a payload comprising a state unit and a transient instruction set and broadcasting the payload to a decentralized data structure to trigger a single-atomic-update. The method further involves instantiating via the transient instruction set a temporary coordinate within the decentralized data structure and adjusting via the transient instruction set the state unit via the temporary coordinate. The method also includes triggering via the transient instruction set a de-allocation of the temporary coordinate from a persistent state whereby the instantiating adjusting and de-allocation occur within the single-atomic-update of the decentralized data structure.

In accordance with additional aspects of the present disclosure, there are provided various methods, apparatuses, systems, and non-transitory computer-readable media that implement the functionality described herein. It is expressly contemplated that any functional step described in relation to a method shall find corresponding support as a structural component of an apparatus or system, and any structural feature described as part of an apparatus or system shall find corresponding support as a step in a method of operation. Specifically, the disclosure provides an apparatus and system configured to implement the functionality of the methods described above, as well as a non-transitory computer-readable medium comprising instructions that, when executed by a processor, cause the processor to perform said methods and realize the technical objectives of the recited apparatuses.

The following architectural advantages result from the integration of the hardware-logic constraints and functional embodiments disclosed herein, providing significant improvements in computational efficiency, data integrity, and system resilience.

The structural configurations of the decentralized state management environment provide a series of technical improvements to the operational efficiency and cryptographic security of distributed ledgers by transforming the physical lifecycle of state data. By integrating a payload generator housing a template-matching circuit and a data-assembly buffer, the system achieves a technical reduction in persistent state occupancy. Traditional architectures treat intermediate transactional steps as permanent artifacts, leading to cumulative state bloat. In contrast, this hardware-logic configuration utilizes a transient instruction set to instantiate temporary coordinates that are physically purged from the persistent state storage within the boundary of a single atomic update. This automated reclamation of short-lived data structures ensures that the network footprint is restricted to final state results rather than intermediate logic fragments.

The implementation of a coordinate derivation assembly further improves network security and forensic obscurity through deterministic masking. By deriving ephemeral addresses via a one-way cryptographic function combined with validator-specific entropy, the system ensures that temporary coordinates exhibit a statistical distribution of a random value to external observers. This configuration prevents logic external to the secure execution environment from accessing or tracking state units during an update cycle, solving the technical problem of forensic address linking and static routing vulnerabilities. Furthermore, the inclusion of a re-entrancy guard within the transient instruction set prevents external calls from the decentralized data structure from modifying the state unit during the update, establishing a hardware-enforced isolation layer for complex transitions.

The payload pruning assembly provides a hardware-mediated mechanism for successively reducing the data size of a payload as it progresses through a branching hierarchy of coordinates. By utilizing a truncation gate to delete completed instructions and compress administrative metadata in real-time, the system reclaims resource credits at each step of a sequence. This dynamic modulation of the data footprint, when coordinated with a state-congestion monitor and compute budget evaluator, allows the network to maintain high transaction velocity even during periods of high computational density by prioritizing the immediate de-allocation of resources over the persistence of intermediate variables.

Finally, the integration of a source authorization gate and latent state anchors enables the secure origination and sequestration of assets without creating permanent data artifacts. By requiring a digital signature to authenticate disposable bytecode against a persistent cryptographic specification, the system ensures that provenance is maintainable even after the associated execution logic has been purged from the ledger. This approach provides a scalable solution for complex, multi-stage transitions across heterogeneous data structures while reconciling the requirements of cryptographic finality with the necessity of automated resource reclamation.

The foregoing and other features of the present disclosure are hereinafter fully described and particularly pointed out in the claims. The following description and the annexed drawings set forth in detail one or more illustrative aspects of the disclosure, such being indicative, however, of but one or a few of the various ways in which the principles of the described embodiments and their equivalents may be employed.

DETAILED DESCRIPTION OF THE DISCLOSURE

Figure 1:
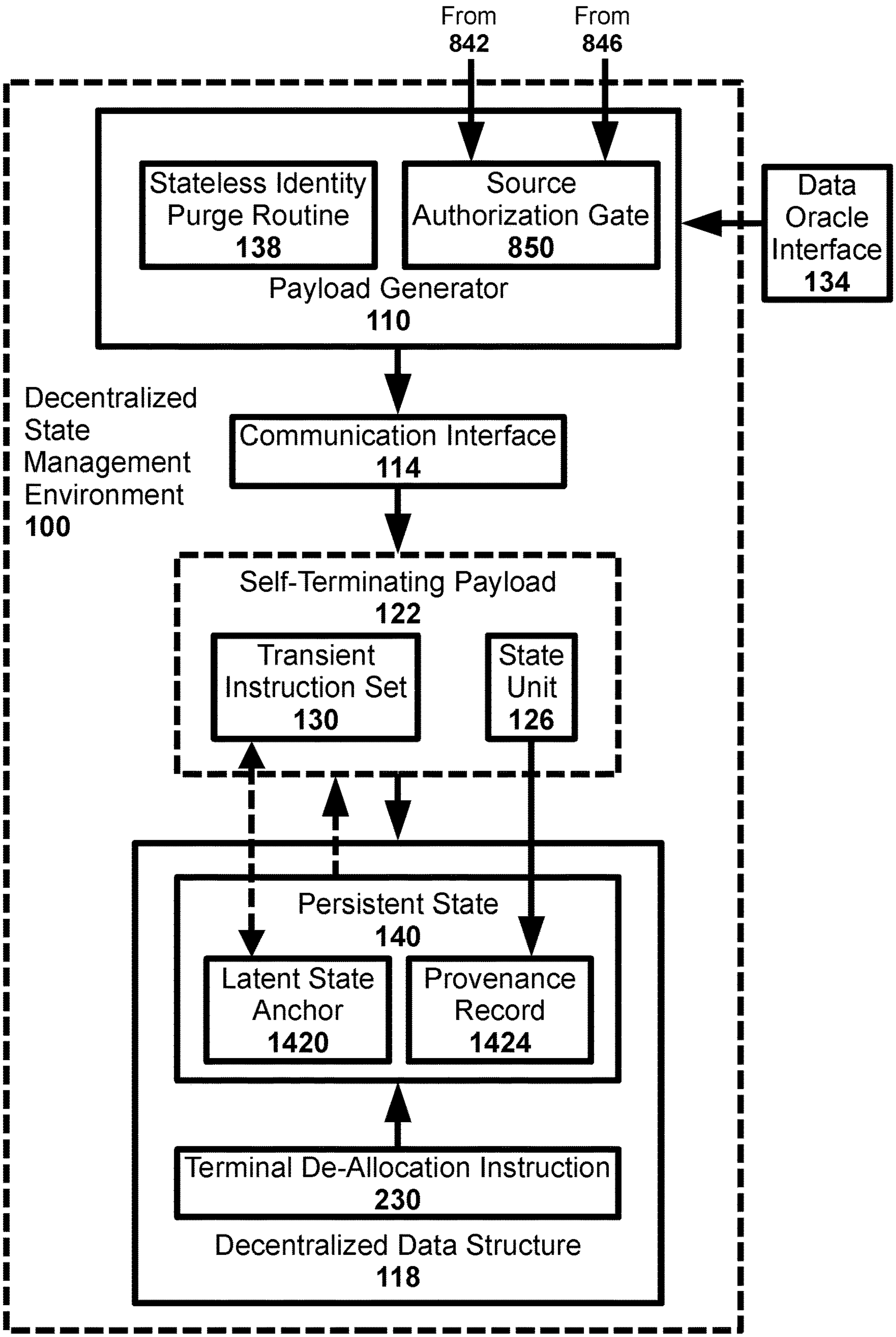
FIG. 1 is a functional block diagram of a decentralized state management environment illustrating the high-level interaction between a payload generator, a communication interface, and a decentralized data structure configured for state origination and sequestration, in accordance with the present disclosure.

The present disclosure will now be described with reference to the drawings, wherein like reference numerals are used to refer to like elements disclosed herein.

For the purposes of the present disclosure, the following technical terms and phrases are to be interpreted according to the specific definitions and functional requirements set forth below, notwithstanding any broader or more generic usage found in external dictionaries or industry standards.

A system for decentralized state management refers to a networked computing environment configured to coordinate data transitions across a distributed ledger, and represents a high-level network architecture configured for atomic state transitions via transient payloads. A decentralized data structure is a distributed database, blockchain, or partitioned ledger where state updates are subject to validation or consensus. A single atomic update represents a discrete transactional boundary or execution cycle wherein all included operations, specifically instantiation, adjustment, and de-allocation, are configured to succeed in unison to achieve finality.

Persistent state represents a data storage tier of the decentralized ledger and the long-term storage layer of a decentralized data structure from which data remains retrievable across multiple transaction cycles and from which temporary coordinates are removed within a single transaction cycle. Within this environment, a payload generator refers to a logic module or processor-based system, comprising a template-matching circuit and data-assembly buffer, configured to assemble discrete, symbiotic data packets and link state units to an authorization source prior to assembly. A communication interface represents a physical network subassembly, including a transmitter and buffer, capable of the transmission and broadcast of data. The decentralized node cluster is a distributed network of physical computing nodes configured to execute atomic updates across a ledger. An authorization source refers to a cryptographic reference or logic module comprising at least one of a persistent origin address, an origination seed, or a latent state anchor.

A payload is a discrete, symbiotic data packet comprising both data to be modified and the logic required to facilitate that modification. A self-terminating payload is a discrete payload comprising a state unit and a transient instruction set characterized by an executable terminal state condition where the associated logic is rendered inoperable upon completion of a transaction or fulfillment of a de-allocation requirement. The internal data architecture refers to the structural arrangement within a payload that defines discrete boundaries for data fragments and metadata and supports proportional metadata reduction. A state unit represents a transient data fragment, such as a value, condition, or access-control permission, that is subject to modification or adjustment. In the context of origination, a state unit may represent a pre-existing state balance to be sequestered from a persistent origin address or a new unit of value authorized for creation by an origination seed. A transient instruction set refers to an ephemeral logic set, such as bytecode fragments or scripts, comprising bytecode fragments for coordinate instantiation, state adjustment, and coordinate de-allocation that defines the functional lifecycle of a temporary coordinate and its associated state unit.

Disposable bytecode refers to a transient instruction set configured to execute a one-time origination event that is verifiable against a cryptographic template but is purged from the persistent state upon de-allocation. Execution logic refers to the computational sequence within the instruction set used to instantiate coordinates and trigger modifications. An ephemeral bytecode fragment represents a sequence of encoded instructions that becomes functionally invalid immediately following the update cycle. A terminal de-allocation instruction refers to a specific logic command that initiates the removal of data from a persistent storage tier.

The processor and memory architecture is a hardware environment configured for staging, isolating, and deriving transient coordinates. An execution processor is a physical silicon unit housing execution sequencers configured to orchestrate instantiation and de-allocation sequences. System memory refers to data storage hardware containing volatile allocations, pre-validated templates, and simulation buffers. A volatile memory buffer is a transient memory partition used to isolate ephemeral bytecode and state units prior to assembly, while a memory allocation is a discrete block of the buffer assigned to a specific state unit fragment and configured for encryption. The pre-validated template library represents a memory partition storing instruction set skeletons for use in automated payload assembly. A temporary coordinate is an ephemeral address, data pointer, or memory location that exists only for the duration of a single atomic update and is subject to automated reclamation.

A cryptographic configuration, cryptographic lock assembly, or envelope is a single secure container and security mechanism encapsulating the state unit and the transient instruction set that binds the finality of a state adjustment to a specific prerequisite, such as the inclusion of a de-allocation instruction. This envelope may comprise a multi-signature container, which refers to a logic gate requiring validator and generator signatures to authorize an update. The logical hash boundary represents a data separation point defining discrete cryptographic input fields for the state unit and the instruction set. An instruction-state hash lock is a specific cryptographic commitment binding state finality to the verified execution of a terminal de-allocation instruction, which restricts state units from being accessed or modified until a de-allocation requirement is verified. A cryptographic commitment represents a specific cryptographic anchor or data flag within a payload header used by a control unit to verify the active status of a cryptographic lock. A latent state anchor refers to a persistent cryptographic template and a set of authorization parameters stored on the decentralized data structure used to verify the validity of origination events. A hash-commitment check refers to a verification routine performed within a secure execution environment to validate the integrity of these commitments. A provenance record is a permanent data record or cryptographic proof linked to a state unit that persists on the decentralized data structure following the purge of disposable bytecode to verify the cryptographic template of the originated unit.

A coordinate derivation assembly refers to hardware or logic circuitry for the deterministic derivation of a temporary coordinate. The secure execution environment is a shielded hardware enclave with isolated bus access for performing sensitive cryptographic hash operations. Hashing logic represents a routine configured to execute a one-way cryptographic function on the transient instruction set, while the one-way cryptographic function is the specific mathematical operation used to derive a deterministic address from the logic hash. An entropy injector is a logic module configured to combine hashes with a validator-specific entropy value to ensure a statistical and random value distribution of the resulting deterministic address, which masks its identity from external observers. The temporal witness validator refers to a hardware logic circuit configured to verify block-height and median-time-past values prior to coordinate derivation. A block-specific witness or temporal window refers to a validation parameter used to restrict the instantiation and accessibility of a coordinate to a specific block height or time interval.

A coordinate sequence assembly represents the structural configuration of a serial sequence of ephemeral addresses. This sequence of temporary coordinates is a serial chain where each coordinate corresponds to a specific adjustment, including a primary ephemeral address and a terminal sequence address, where a subsequent temporary coordinate is dynamically derived based on a preceding adjustment result of a preceding temporary coordinate. Dynamic derivation logic refers to a routine configured to calculate a subsequent temporary coordinate based on a preceding adjustment result from a preceding temporary coordinate. The branching hierarchy assembly or branching hierarchy is a multi-level framework for the parallelized adjustment of multiple state units across branching temporary coordinates. Within this hierarchy, a coordinate split point is a logical juncture where execution bifurcates into multiple concurrent execution paths leading to a branch termination point. Deterministic sequencing logic refers to a routine within the branching hierarchy configured to prevent state-collisions between parallel processing paths and adjustments of multiple state units. A recursion-depth limit represents a predefined integer threshold used to abort a sequence if coordinate instantiation exceeds a specific count.

The payload pruning assembly refers to functional logic for reducing the data footprint during sequence progression. Pruning logic or payload pruning refers to an execution routine that deletes completed instructions to limit the occupied network footprint. Completed instructions represent a subset of logic marked for deletion after execution at a specific preceding coordinate. A truncation gate represents a logical boundary that severs bytecode fragments from the payload following de-allocation. The monotonically shrinking payload refers to the physical state of the data object as it reduces in bit-size through a monotonic reduction path during an update cycle. A pruning trigger is a signal or parameter generated by successful de-allocation that initiates the truncation and reduction of the payload data footprint, leaving only the instruction subset required for subsequent operations.

State bifurcation logic is a sub-assembly of the instruction set comprising a logic-splitter for dividing or bifurcating a state unit into persistent and residual components during a transaction. A persistent destination fragment is the specific portion of a state unit routed to a permanent storage location during the single atomic update. A residual transient fragment refers to the remaining portion of the state unit routed to a subsequent temporary coordinate in a sequence. A hidden destination router is a logic gate within the transient instruction set that reveals the destination address only at the moment of state adjustment. A persistent destination address represents a permanent storage location, which may reside on-chain or cross-chain on a primary or heterogeneous ledger. The residual-value aggregator refers to a routine for summing residual transient fragments following a complex branching or sequence execution, while the designated origin address is the pre-defined target address for the automatic and automated relocation of these values during a de-allocation phase. Sequestration refers to the process of routing a pre-existing state balance from a persistent origin address into a temporary coordinate for the duration of an atomic update.

An execution calibration assembly is the hardware and logic framework within the data structure for modulating payload execution. The atomic execution orchestrator is the primary logic engine within a node cluster configured to sequence instantiation and de-allocation phases. A state-congestion monitor is a logic module configured to query network load and determine a state-congestion parameter, which represents a dynamic data value indicating the current occupancy or cost density of the persistent state storage. The compute budget evaluator refers to a routine that assesses available processing limits, gas, and processing limits against a limit. A current-block-limit represents a predefined threshold for the maximum compute requirement allowable within a single atomic update. Instruction fragmentation logic represents a routine configured to split a transient instruction set into a plurality of atomic sub-payloads. An atomic sub-payload is a discrete fragment of logic that maintains a functional dependency with related fragments, ensuring they succeed or fail as a single unit via a cascading-reversion trigger configured to preserve functional dependency and revert all related sub-payloads upon the failure of a single functional dependency.

A cascading-reversion trigger is a logic signal configured to revert all related sub-payloads or state changes upon the failure of a single functional dependency. Reverting persistent state refers to returning a data structure and persistent state storage to a pre-transaction configuration following a failure, state-conflict, or logic-conflict. A re-entrancy-guard represents a logical lock within the transient instruction set that prevents external calls from the node cluster from modifying a state unit during an update. A validator-set consistency check refers to a methodological step ensuring the set of nodes authorizing a broadcast remains invariant until de-allocation of the temporary coordinate is complete. A gas price monitor is a logic module within the calibration assembly configured to delay broadcast until a predefined gas price threshold is met. Broadcast timing logic refers to a routine configured to adjust payload transmission based on a predicted state-reclamation credit to ensure the resource credit from the de-allocation is maximized.

An automated state reclamation process refers to the systematic deletion of transient data and instruction sets from persistent storage. A resource credit or gas refund represents a quantifiable computational or economic benefit generated by the de-allocation of coordinates, which can be applied to offset the costs of subsequent operations. A state reclamation event refers to the confirmed deletion of a coordinate from the ledger. Calculating state reclamation refers to determining the volume of storage and compute resources released by a coordinate purge. Monitoring state reclamation involves tracking the deletion of the temporary coordinate to confirm transaction finality. Releasing resource credit refers to the allocation of a gas refund or computational credit to the system memory for use in a subsequent payload assembly.

An off-chain diagnostic simulation refers to a sandboxed execution of a payload within a local execution environment or local state buffer to identify logic-conflicts between the transient instruction set and existing persistent state logic. A heterogeneous data structure is a secondary decentralized ledger or database with a distinct protocol from the primary ledger. A cross-chain transition assembly is an integrated framework for executing state transfers between a primary structure and a heterogeneous data structure. The cross-chain logic module refers to a sub-assembly of the transient instruction set configured to translate state formats between disparate protocols. A state transfer prerequisite is a specified validation requirement that is satisfied prior to the de-allocation of the temporary coordinate. The persistent cross-chain address represents a specific final storage location residing within a secondary or heterogeneous ledger. Transition notification logic refers to a logic routine for generating an asynchronous event log or encrypted signal for a persistent cross-chain address holder.

Having defined the technical terms and functional requirements above, the structural implementation and operative environment of these components will now be described with reference to the accompanying drawings. The following embodiments are provided as non-limiting examples intended to illustrate the principles of the disclosure rather than to restrict the scope of the claims.

Referring to FIG. 1, the Decentralized State Management Environment 100 provides a hardware and logic framework for executing state transitions that remain decoupled from long-term storage obligations. The Decentralized State Management Environment 100 is anchored by a Payload Generator 110, which is a specialized processing node housing a template-matching circuit and a data-assembly buffer. The Payload Generator 110 is configured to construct a Self-Terminating Payload 122 by physically mapping a State Unit 126 to a Transient Instruction Set 130 within a localized memory partition. To ensure the integrity of the data introduced into the environment, the Payload Generator 110 comprises a Source Authorization Gate 850 (see FIG. 8), which validates whether the State Unit 126 is sequestered from a Persistent Origin Address 842 (see FIG. 8) or originated as a new data fragment via an Origination Seed 846 (see FIG. 8).

The transport and broadcast of the constructed payload are facilitated by a Communication Interface 114, which comprises a physical network sub-assembly such as a high-speed transmitter and a dedicated broadcast buffer. The Communication Interface 114 is logically downstream of the Payload Generator 110 and serves as a bridge between the local assembly logic and the Decentralized Data Structure 118, which is configured as a distributed network of physical computing nodes. These nodes are configured to execute the atomic update by referencing a Latent State Anchor 1420 (see FIG. 14) stored within the Persistent State 140. This anchor provides a cryptographic specification used to verify the legitimacy of the Transient Instruction Set 130 before it is permitted to modify the ledger. Furthermore, the environment is configured to interface with a Data Oracle Interface 134, which allows the Transient Instruction Set 130 to be populated with off-chain environmental variables, while a Stateless Identity Purge Routine 138 is configured to scrub metadata from the generator to obscure the link between the payload and the originating agent.

The lifecycle of the Self-Terminating Payload 122 is governed by the requirement to achieve finality and de-allocation in unison. Within the Decentralized Data Structure 118, the payload instantiates a temporary coordinate, representing a non-persistent memory address, where the State Unit 126 is adjusted. Once the adjustment parameters are satisfied, the Terminal De-allocation Instruction 230 (see FIG. 2) triggers a reclamation event that purges the temporary coordinate and the Transient Instruction Set 130 from the Persistent State 140. For originated state units, the system ensures auditability by committing a Provenance Record 1424 (see FIG. 14) to the ledger, which persists even after the logic that created it has been destroyed. This architecture ensures that the Decentralized State Management Environment 100 functions as a transient state processor that minimizes state bloat.

In a practical application, this environment functions as a one-time-use value forwarding gateway that exists only for the duration of a single state transfer. For a user initiating an asset move, the system avoids the use of a permanent, static routing address that could attract unwanted forensic scrutiny or unauthorized secondary pulls. The system instead provides a transient conduit that is generated to facilitate the movement of value and is destroyed immediately upon the verification of the transfer. This ensures that the digital footprint of the user is fundamentally minimized as the gateway address is removed from the active state of the network. This high-level coordination of the birth and death of data objects shifts the technical focus to the specific internal structural boundaries of FIG. 2.

Figure 2:
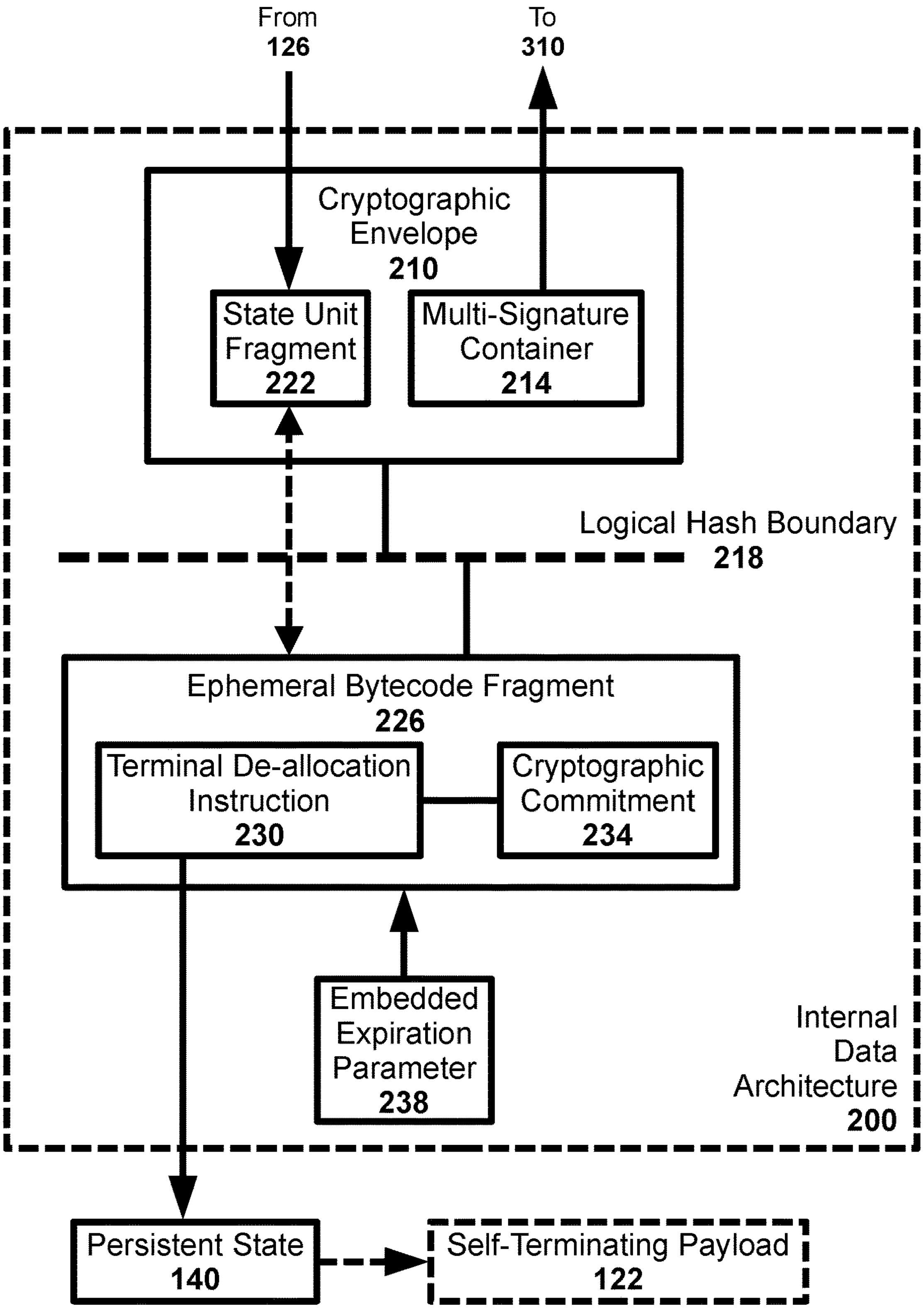
FIG. 2 is a functional block diagram illustrating the internal data architecture of a payload, specifically the discrete boundaries between a state unit and a transient instruction set, in accordance with the present disclosure.

Referring to FIG. 2, the Internal Data Architecture 200 defines the structural arrangement and discrete boundaries of the Self-Terminating Payload 122 (see FIG. 1). The Internal Data Architecture 200 is configured to support header compression for proportional metadata reduction and is encapsulated within a Cryptographic Envelope 210. The Cryptographic Envelope 210 represents a secure container that isolates the sensitive data of the State Unit 126 from the logic of the Transient Instruction Set 130 (see FIG. 1). To authorize an update within the Decentralized Data Structure 118 (see FIG. 1), the Cryptographic Envelope 210 includes a Multi-Signature Container 214, which functions as a logic gate requiring verified signatures from both a validator and the Payload Generator 110 (see FIG. 1). The Multi-Signature Container 214 is configured to prevent the Execution Processor 310 (see FIG. 3) from instantiating the payload if signature verification fails.

A Logical Hash Boundary 218 is established within the Internal Data Architecture 200 to define discrete cryptographic input fields. This boundary 218 ensures the functional independence of the underlying data types, allowing the system to process logic without exposing the raw state data. This separation point ensures that the State Unit Fragment 222 and the Ephemeral Bytecode Fragment 226 are treated as distinct logical entities while remaining bound within the same symbiotic object. The State Unit Fragment 222 represents a specific portion of the State Unit 126 prepared for adjustment or bifurcation, as further detailed in the State Bifurcation Logic 800 (see FIG. 8), whereas the Ephemeral Bytecode Fragment 226 contains the encoded logic of the instruction set. The Internal Data Architecture 200 further includes an Embedded Expiration Parameter 238, which defines a specific block interval or mempool expiry for the validity of the payload.

The functional finality of the Internal Data Architecture 200 is governed by the Terminal De-allocation Instruction 230 and a corresponding Cryptographic Commitment 234. The Terminal De-allocation Instruction 230 is a mandatory logic instruction within the Ephemeral Bytecode Fragment 226 that requires the physical deletion of the temporary coordinate from the Persistent State 140 (see FIG. 1) post-adjustment. The Cryptographic Commitment 234 is a hash-based commitment that binds the finality of the state transition to the verified execution of this de-allocation. This structural binding ensures that the state adjustment and the state purge are executed as a single, inseparable atomic event.

In a practical application, this internal architecture functions as a secure digital envelope for an atomic KYC identity verifier. The system acts as a zero-knowledge courier carrying sensitive personally identifiable information to a verification service where the symbiotic relationship between the identity data and the verification logic ensures that the information is only accessible for the duration of the check. Once the verification is confirmed, the sensitive identity fragments are atomically purged from the persistent state layer by the terminal de-allocation instruction, leaving only a persistent verification status on the ledger without the liability of permanent data storage, which necessitates the hardware staging and isolation protocols of FIG. 3.

Figure 3:
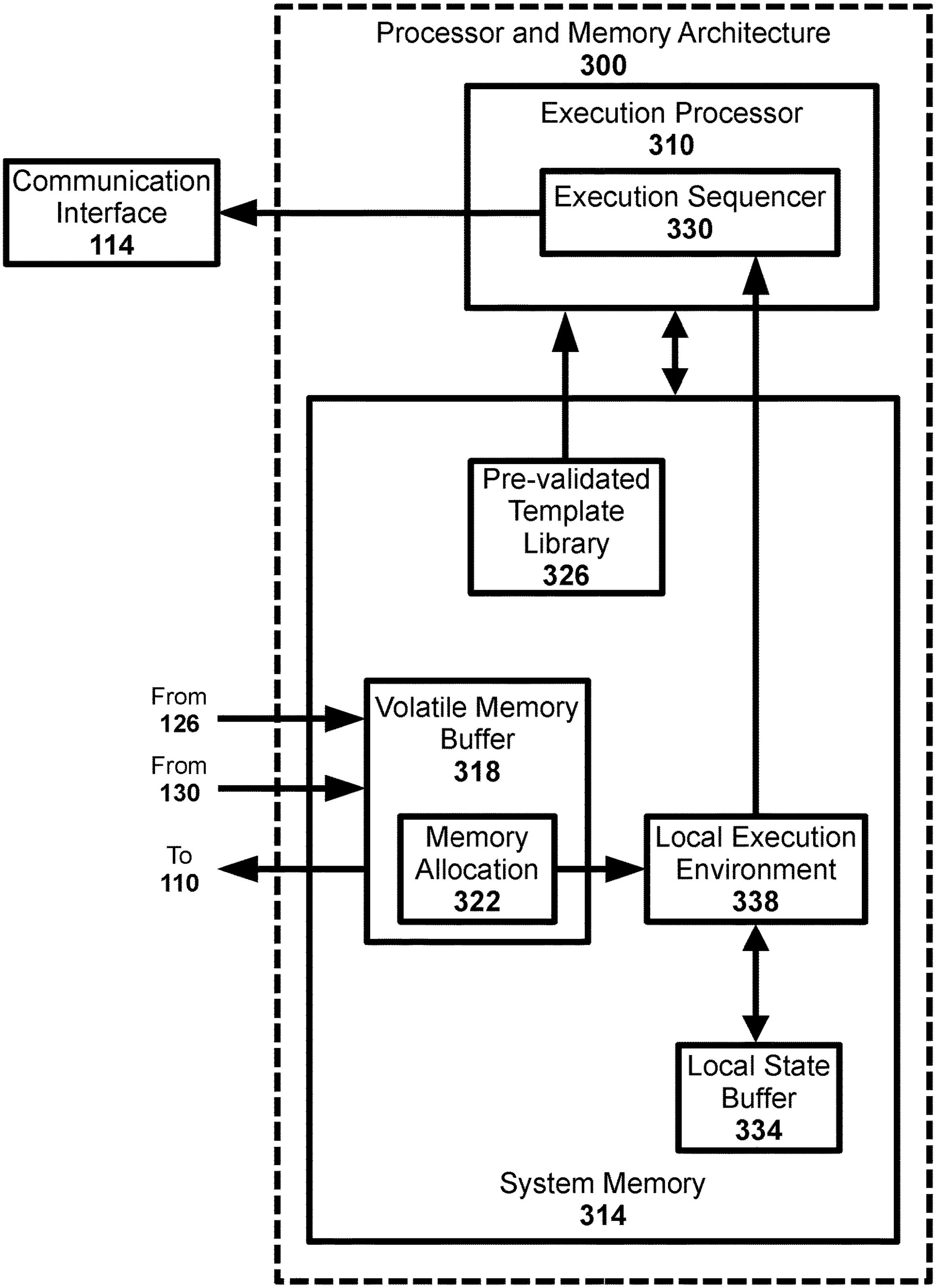
FIG. 3 is a functional block diagram of a processor and memory architecture illustrating the isolation of a volatile memory buffer and the staging of ephemeral bytecode prior to assembly in accordance with the present disclosure.

Referring to FIG. 3, the Processor and Memory Architecture 300 comprises the hardware environment configured for staging, isolating, and deriving transient coordinates. The Processor and Memory Architecture 300 includes an Execution Processor 310, which is a physical silicon unit housing execution sequencers configured to orchestrate instantiation and de-allocation sequences. The Execution Processor 310 is communicatively coupled to a System Memory 314, which provides high-speed storage for volatile allocations, pre-validated templates, and simulation buffers.

The System Memory 314 is partitioned to include a Volatile Memory Buffer 318, which is a transient memory partition used to isolate the Transient Instruction Set 130 (see FIG. 1) and State Units 126 (see FIG. 1) prior to assembly within the Payload Generator 110. Within the Volatile Memory Buffer 318, the system is configured to establish a Memory Allocation 322, which is a discrete block assigned to a specific State Unit Fragment 222 (see FIG. 2) and configured for encryption. To facilitate automated-payload assembly, the System Memory 314 further includes a Pre-validated Template Library 326 containing instruction-set skeletons.

The Processor and Memory Architecture 300 provides a local verification environment to ensure payload integrity prior to network transmission. An Execution Sequencer 330 is configured to modulate the broadcast of atomic sub-payloads and monitor broadcast timing via the Communication Interface 114 (see FIG. 1). Diagnostic verification is performed using a Local State Buffer 334, which is a diagnostic memory area used for verifying state consistency and simulating updates. The Local Execution Environment 338 is a sandboxed logic space configured to execute a sandboxed trial of the payload against the data in the Local State Buffer 334 to verify re-entrancy-guards and de-allocation requirements prior to authorizing the Communication Interface 114 to release the payload.

In a practical application, this architecture enables secure hardware-token staging by providing physical isolation for sensitive data during the assembly of a blockchain transaction. A hardware wallet utilizing this staging process can prepare complex instructions in an isolated volatile-memory partition without ever exposing private keys to the internet-connected portions of a device. The ephemeral bytecode remains isolated in the Volatile Memory Buffer 318 until the moment of broadcast, preventing side-channel attacks from leaking the assembly logic and ensuring that the subsequent generation of the deterministic address is bound to a verified secure hardware enclave as detailed in the Coordinate Derivation Assembly of FIG. 4.

Figure 4:
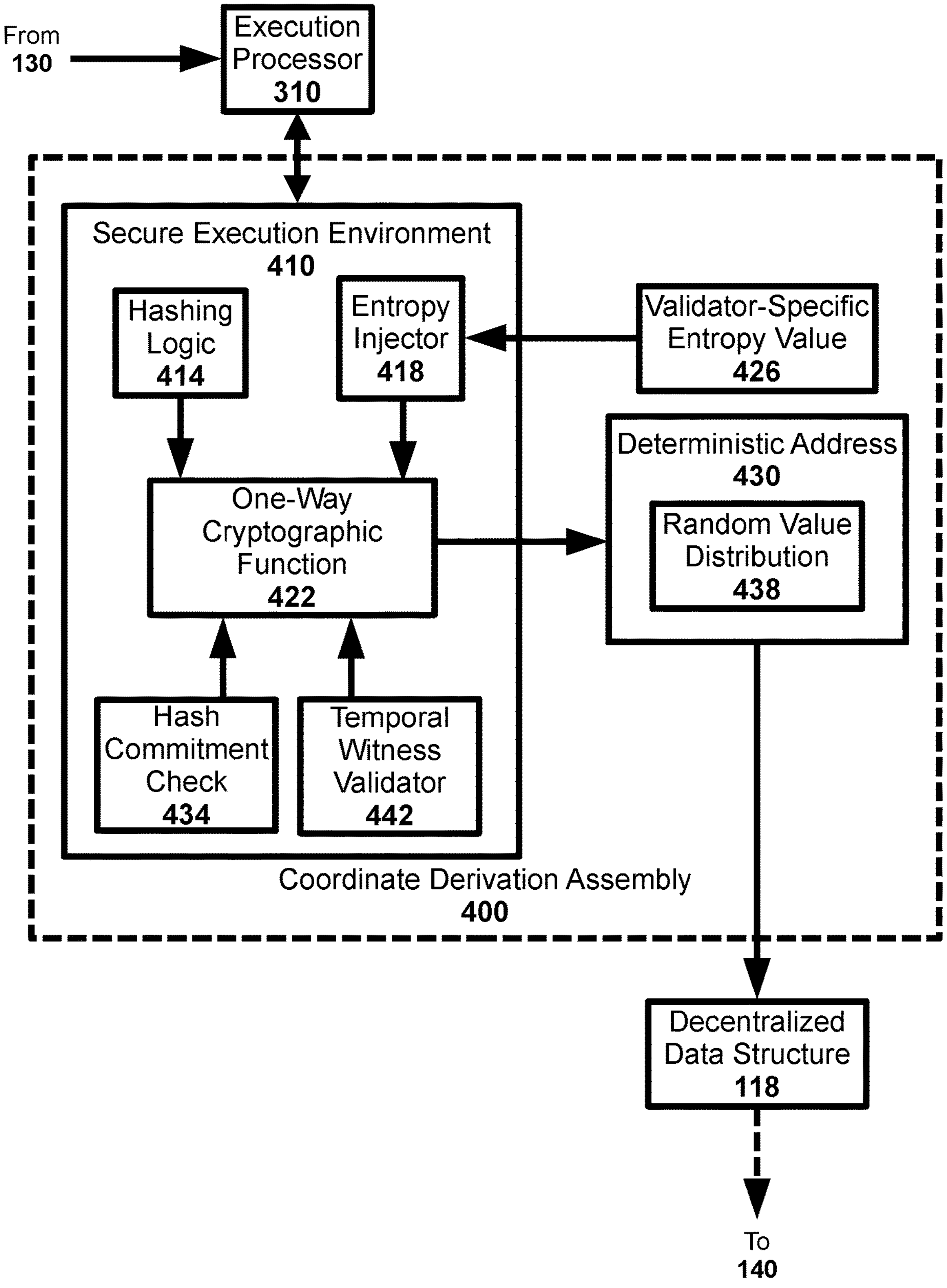
FIG. 4 is a functional block diagram illustrating the logic for a secure execution environment (SEE) and the deterministic derivation of a temporary coordinate from a hash of a transient instruction set in accordance with the present disclosure.

Referring to FIG. 4, the Coordinate Derivation Assembly 400 provides the logical and hardware framework for the deterministic derivation of a Deterministic Address 430, configured to function as a transient, non-persistent destination. The Coordinate Derivation Assembly 400 is configured to execute a cryptographic mapping of logic to location, where the specific bit-string of the Transient Instruction Set 130 (see FIG. 1) dictates the resultant address. This assembly 400 is governed by a Secure Execution Environment (SEE) 410, which is configured as a shielded hardware enclave with isolated bus access to prevent external leakage of intermediate hash states during sensitive cryptographic operations. The SEE 410 is communicatively coupled to the Execution Processor 310 (see FIG. 3) and is configured to ingest logic from the Transient Instruction Set 130 to begin the derivation process.

Internal to the SEE 410, Hashing Logic 414 is configured to execute a One-Way Cryptographic Function 422 on the Transient Instruction Set 130. This operation binds the resulting coordinate to the specific logic of the payload, ensuring that the address is a product of the instructions it is meant to execute. To ensure statistical uniqueness and prevent coordinate collisions or predictability, an Entropy Injector 418 is configured to combine the hashed logic with a Validator-Specific Entropy Value 426. The SEE 410 is configured to utilize the One-Way Cryptographic Function 422 to produce a 256-bit output, which is then truncated or mapped to the specific address format of the Decentralized Data Structure 118 (see FIG. 1). The output of this injection is the Deterministic Address 430, which exhibits a Random Value Distribution 438. This characteristic effectively masks the coordinate from external observers by ensuring the address is not derived from user-identifiable metadata, but rather from the functional bytecode.

Verification within the SEE 410 is managed by a Hash-Commitment Check 434 and a Temporal Witness Validator 442. The Hash-Commitment Check 434 is a logic circuit configured to compare the provided bytecode against the Cryptographic Commitment 234 (see FIG. 2) to ensure the Transient Instruction Set 130 has not been tampered with prior to derivation. Simultaneously, the Temporal Witness Validator 442 verifies block-height and median-time-past values to ensure the derivation occurs within a valid execution window. Once verified, the Deterministic Address 430 is instantiated within the Decentralized Data Structure 118 for the duration of the atomic update. Following the retrieval of assets and the execution of state adjustments, the coordinate is purged from the Persistent State 140 (see FIG. 1), thereby removing the functional record of the coordinate and terminating the existence of the destination.

In a practical application, this assembly functions as a transient destination generator for a privacy-enhancing state transition. When a sender initiates a transfer, the recipient provides a logic template-acting as a component of the Transient Instruction Set 130—rather than a static public key. The Coordinate Derivation Assembly 400 processes this template to generate a unique, one-time Deterministic Address 430. Because this address is derived from a combination of the instruction set and real-time Validator-Specific Entropy 426, it is functionally distinct from the recipient's persistent identity. Upon execution of the state adjustment, the Terminal De-allocation Instruction 230 prunes the coordinate from the Persistent State 140, ensuring the destination address exists only for the duration of the atomic update, thereby minimizing the detectable on-chain footprint of the participating agents. This high-level coordination of the birth and death of data objects shifts the technical focus to the specific internal structural boundaries of FIG. 5.

Figure 5:
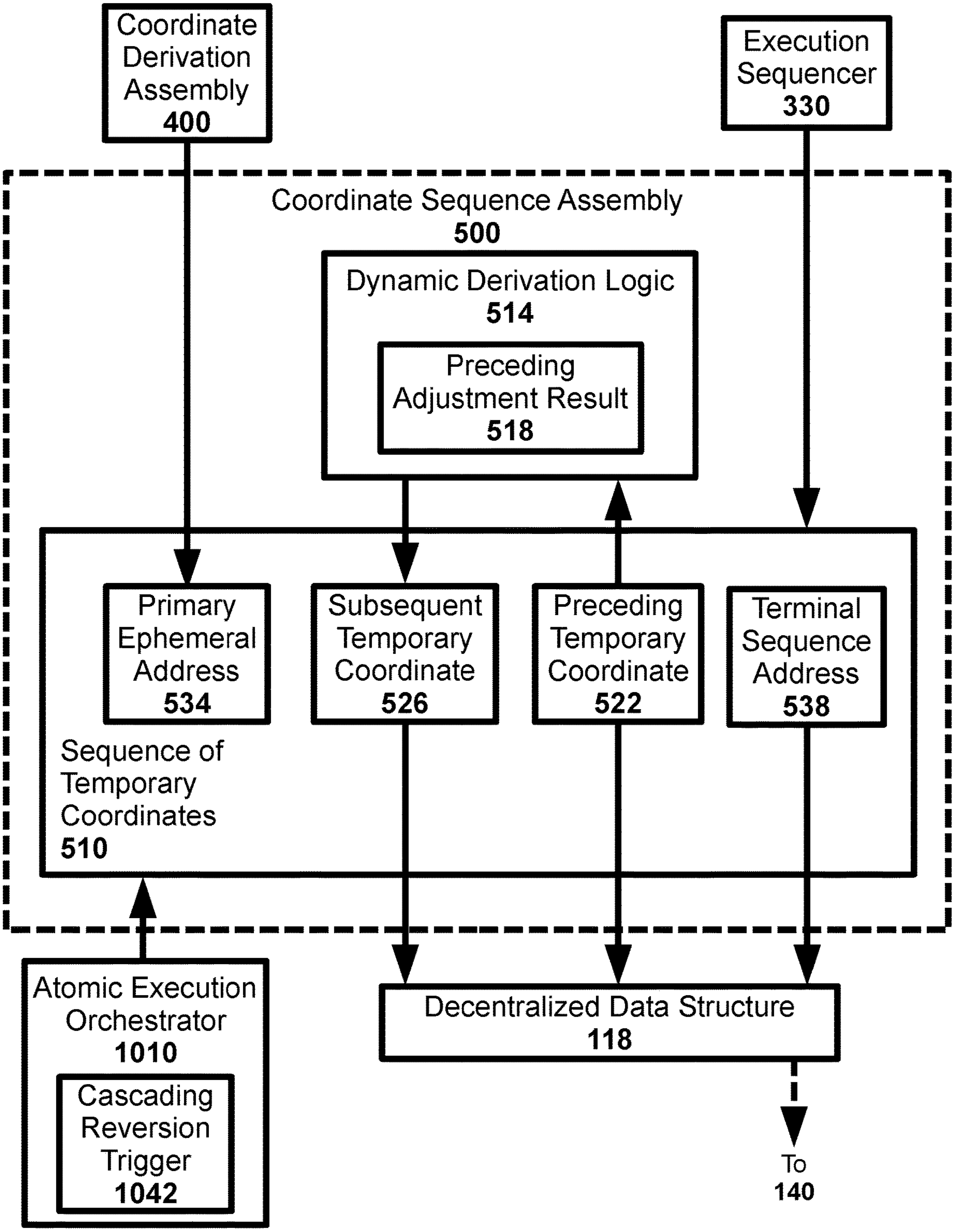
FIG. 5 is a functional block diagram illustrating the structural configuration of a sequence of temporary coordinates and the logic for the dynamic derivation of subsequent addresses in accordance with the present disclosure.

Referring to FIG. 5, the Coordinate Sequence Assembly 500 provides the structural configuration for a serial sequence of temporary coordinates used to execute multi-stage state transitions. The Coordinate Sequence Assembly 500 is configured to manage a Sequence of Temporary Coordinates 510, wherein each discrete address in the chain corresponds to a specific, sequential adjustment within a single atomic update. This assembly 500 utilizes Dynamic Derivation Logic 514 to calculate the address of a Subsequent Temporary Coordinate 526 based on a Preceding Adjustment Result 518 and a Preceding Temporary Coordinate 522. Specifically, the Dynamic Derivation Logic 514 is configured to ingest the cryptographic hash of the state change recorded at the Preceding Temporary Coordinate 522 as a salt for the derivation of the next address. This architectural coupling ensures a functional dependency between stages, where the instantiation of a new coordinate is physically and cryptographically bound to the successful processing and de-allocation of the coordinate prior.

The Coordinate Sequence Assembly 500 defines a Chronological Execution Flow that governs the serialized progression of the Transient Instruction Set 130 (see FIG. 1). The sequence initiates at a Primary Ephemeral Address 534, which is derived from the primary instruction set hash via the Coordinate Derivation Assembly 400 (see FIG. 4). As the update progresses, the system is configured to verify that a Preceding Temporary Coordinate 522 has been successfully de-allocated from the Persistent State 140 (see FIG. 1) before the Subsequent Temporary Coordinate 526 is instantiated within the Decentralized Data Structure 118 (see FIG. 1). The Execution Sequencer 330 (see FIG. 3) is configured to hold the Subsequent Temporary Coordinate 526 in a local buffer until the de-allocation signal of the previous coordinate is verified by the Temporal Witness Validator 442 (see FIG. 4). This serialized birth-and-death cycle of data objects continues until the payload reaches the Terminal Sequence Address 538, which serves as the final exit coordinate, ensuring that no intermediate state fragments remain active if the finality of the sequence is not achieved.

In a practical application, this assembly is configured to manage the execution of a complex flash-loan swap across three different decentralized liquidity pools. A user initiates the sequence by broadcasting a payload where each pool interaction is represented by a temporary coordinate in a chain. The Execution Sequencer 330 (see FIG. 3) is configured to monitor the state of the Preceding Temporary Coordinate 522; upon the verification of the terminal de-allocation of said coordinate, the sequencer releases the instantiation signal for the Subsequent Temporary Coordinate 526. This configuration ensures that if any single step in the sequence fails to meet a re-entrancy-guard or execution parameter, the entire chain is restricted from further instantiation, causing the Atomic Execution Orchestrator 1010 to trigger a Cascading-Reversion Trigger 1042. This ensures the entire trade is treated as a single, multi-stage atomic unit where zero residual state remains on the ledger post-execution. This serialized management of state transitions ensures that complex trades maintain a zero-footprint impact on the long-term ledger state, shifting the technical focus to the parallelized logic structures of FIG. 6.

Figure 6:
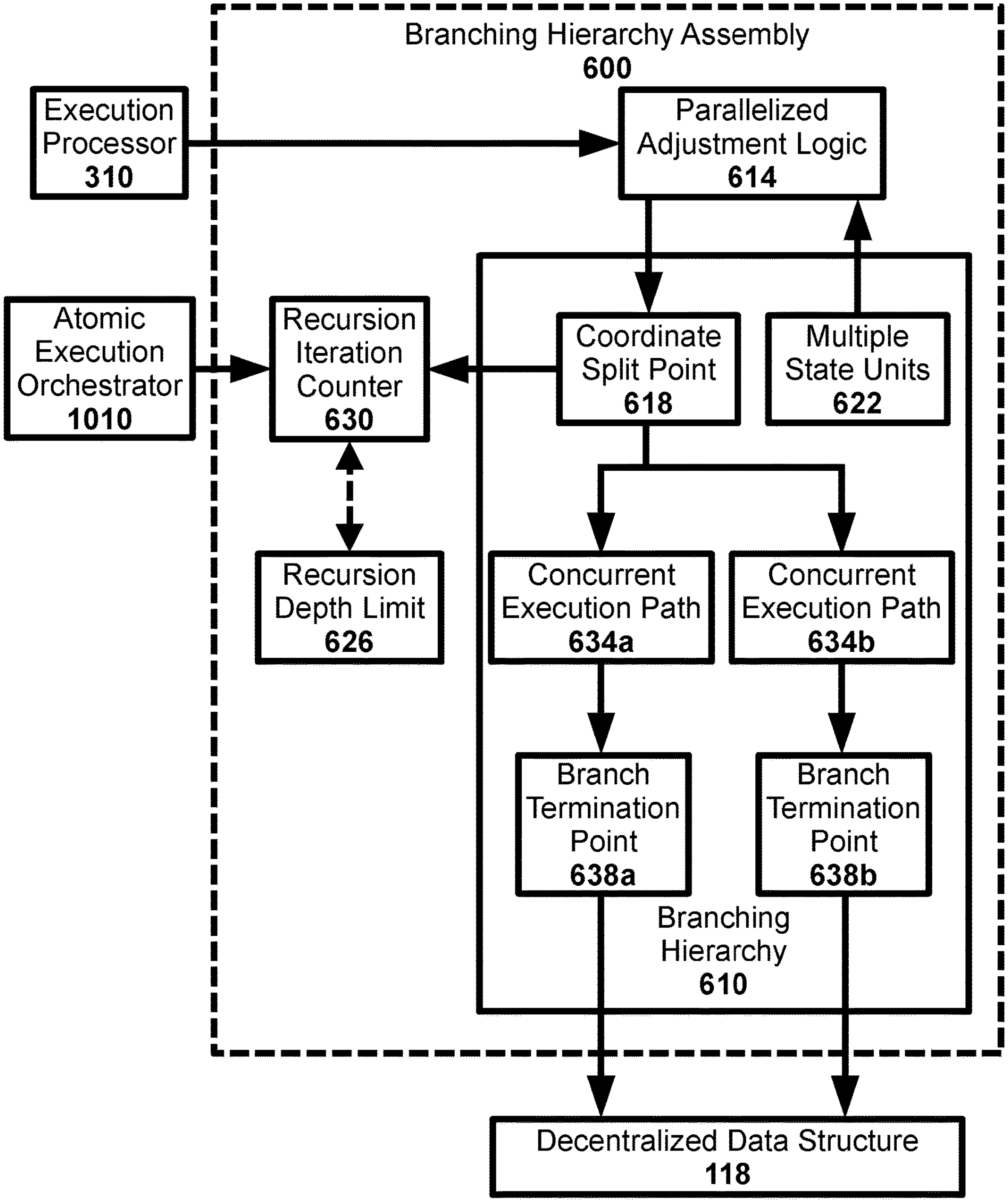
FIG. 6 is a functional block diagram illustrating a branching hierarchy of temporary coordinates and the parallelized adjustment of multiple state units within a single atomic update in accordance with the present disclosure.

Referring to FIG. 6, the Branching Hierarchy Assembly 600 provides the hardware and logical framework for the parallelized adjustment of Multiple State Units 622 across divergent coordinate paths. The Branching Hierarchy Assembly 600 is configured to instantiate a Branching Hierarchy 610, which comprises a multi-level arrangement of temporary coordinates governed by deterministic sequencing logic. This assembly 600 interfaces with the Execution Processor 310 to manage complex state transitions that bifurcate from a single root event into a plurality of concurrent threads. The Execution Processor 310 is configured to partition System Memory 314 into isolated Memory Allocations 322 for each branch, ensuring that parallel adjustments do not result in race conditions.

The Branching Hierarchy 610 is governed by Parallelized Adjustment Logic 614, which comprises instructions within the Transient Instruction Set 130 configured to modify Multiple State Units 622 simultaneously. To manage the expansion of the hierarchy, the assembly 600 identifies a Coordinate Split Point 618, representing a logical juncture where the instruction set bifurcates the execution path into a plurality of branches, illustrated here as Concurrent Execution Path **634*a* and Concurrent Execution Path 634*b*. Each path 634***a*, 634*b* operates as an isolated thread, allowing for the independent processing of state fragments. To ensure system stability and prevent resource exhaustion, the Branching Hierarchy 610 is configured to monitor a Recursion Iteration Counter 630 against a predefined Recursion-Depth Limit 626. The Recursion Iteration Counter 630 is a dedicated register configured to increment upon each coordinate instantiation within the Decentralized Data Structure 118. The Atomic Execution Orchestrator 1010 is configured to query the Recursion Iteration Counter 630 at each Coordinate Split Point 618. If the Recursion-Depth Limit 626 is exceeded, the system is configured to abort the sequence to protect the integrity of the Persistent State 140.

Each branch within the hierarchy terminates at a discrete termination point, illustrated as Branch Termination Point 638*a* and Branch Termination Point 638*b*. At these junctures, the state is either merged back into a primary sequence or prepared for a final transfer. The Parallelized Adjustment Logic 614 ensures that as each temporary coordinate in the Branching Hierarchy 610 reaches its respective termination point 638*a*, 638*b*, the corresponding Terminal De-allocation Instruction 230 is triggered. This synchronization ensures that a massive plurality of ephemeral assets can be adjusted and subsequently purged from the network state in a single atomic event, preventing the accumulation of short-lived data fragments on the ledger.

In a practical application, this assembly functions as a self-cleaning game state hierarchy used to manage ephemeral game entities such as shrapnel or projectiles in a Web3 metaverse environment. A single atomic event is configured to trigger the Coordinate Split Point 618, which bifurcates into hundreds of branches simultaneously. The Parallelized Adjustment Logic 614 is configured to map each branch to a discrete State Unit Fragment 222 (see FIG. 2), which is processed in parallel across the node cluster 118. As these objects interact with the environment and expire, the Atomic Execution Orchestrator 1010 synchronizes the plurality of Terminal De-allocation Instructions 230 into a single state-reclamation event. This prevents permanent ledger bloat from short-lived gaming assets and ensures that the Gas Price Monitor 1046 and Compute Budget Evaluator 1018 (see FIG. 10) calibrate the execution density to ensure the entire explosion event is finalized within the Current-Block-Limit 1030. This high-level coordination of the birth and death of data objects shifts the technical focus to the specific internal structural boundaries of FIG. 7.

Figure 7:
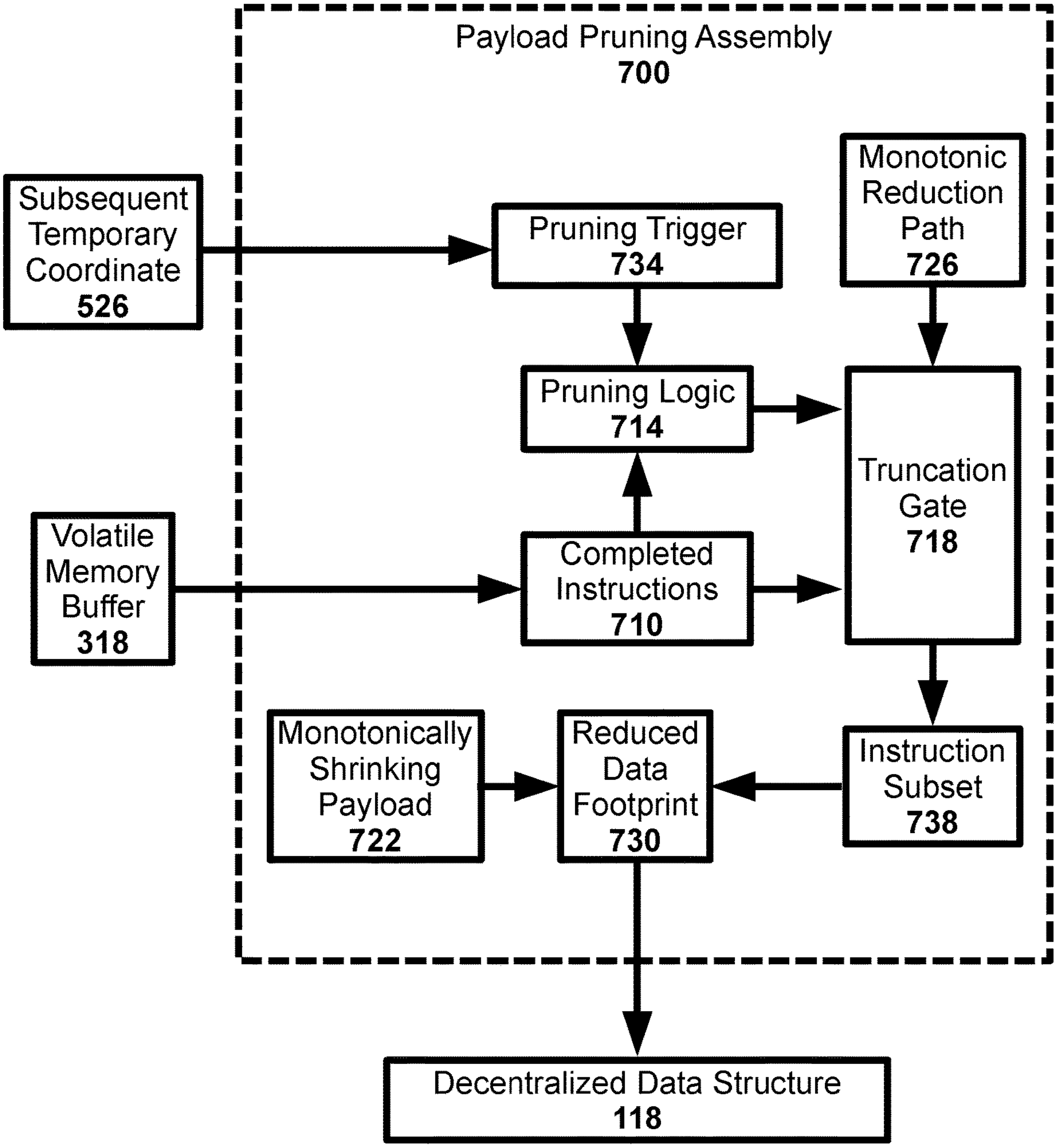
FIG. 7 is a functional block diagram illustrating the logic for payload pruning and instruction truncation at successive coordinates in a sequence to reduce a data footprint in accordance with the present disclosure.

Referring to FIG. 7, the Payload Pruning Assembly 700 provides the functional logic for reducing the data footprint of the Self-Terminating Payload 122 during the progression of a sequence or branching hierarchy. The Payload Pruning Assembly 700 is configured to manage the transition of the data object into a Monotonically Shrinking Payload 722, wherein the bit size of the object is reduced via instruction de-referencing and administrative metadata compression. This assembly 700 comprises Pruning Logic 714, which is an execution routine configured to identify bytecode fragments associated with Completed Instructions 710 and mark them for immediate exclusion from the next state propagation to reclaim network resource credits and minimize the load on the Decentralized Data Structure 118.

The Pruning Logic 714 operates in conjunction with a Truncation Gate 718, which defines a logical boundary that severs bytecode fragments from the payload following their successful execution and the subsequent de-allocation of a corresponding temporary coordinate. The pruning process is initiated by a Pruning Trigger 734, which is a signal generated by the successful de-allocation of a coordinate in the Chronological Execution Flow. Upon activation of the Pruning Trigger 734, the system is configured to identify the subset of the Transient Instruction Set 130 that has been consumed at a preceding coordinate. These Completed Instructions 710 are then purged from the Volatile Memory Buffer 318, leaving only the Instruction Subset 738 required for the instantiation of Subsequent Temporary Coordinates 526 or the execution of the Terminal De-allocation Instruction 230.

The progression of the data object along the Monotonic Reduction Path 726 results in a Reduced Data Footprint 730 at each stage of the atomic update. By iteratively removing logic that is no longer functionally relevant to the remaining execution path, the Payload Pruning Assembly 700 reduces the cumulative gas cost associated with state management. This reduction is proportional to the reclaimed state footprint and the volume of bytecode purged before the payload reaches the terminal de-allocation phase.

In a practical application, this assembly enables a gas-efficient smart contract interaction by facilitating the pruning of data to reduce network costs during complex execution. In a high-frequency trading scenario, instructions that have already been executed at a preceding coordinate are deleted in real-time as the payload progresses through its reduction-path. By shrinking the digital footprint as logic is consumed, the Monotonically Shrinking Payload 722 reclaims resource credits at every step, significantly lowering the gas cost for the end user compared to traditional persistent smart contracts that maintain the full instruction set for the duration of the transaction block. This dynamic optimization of the payload bit size shifts the technical focus to the specific internal structural boundaries of FIG. 8.

Figure 8:
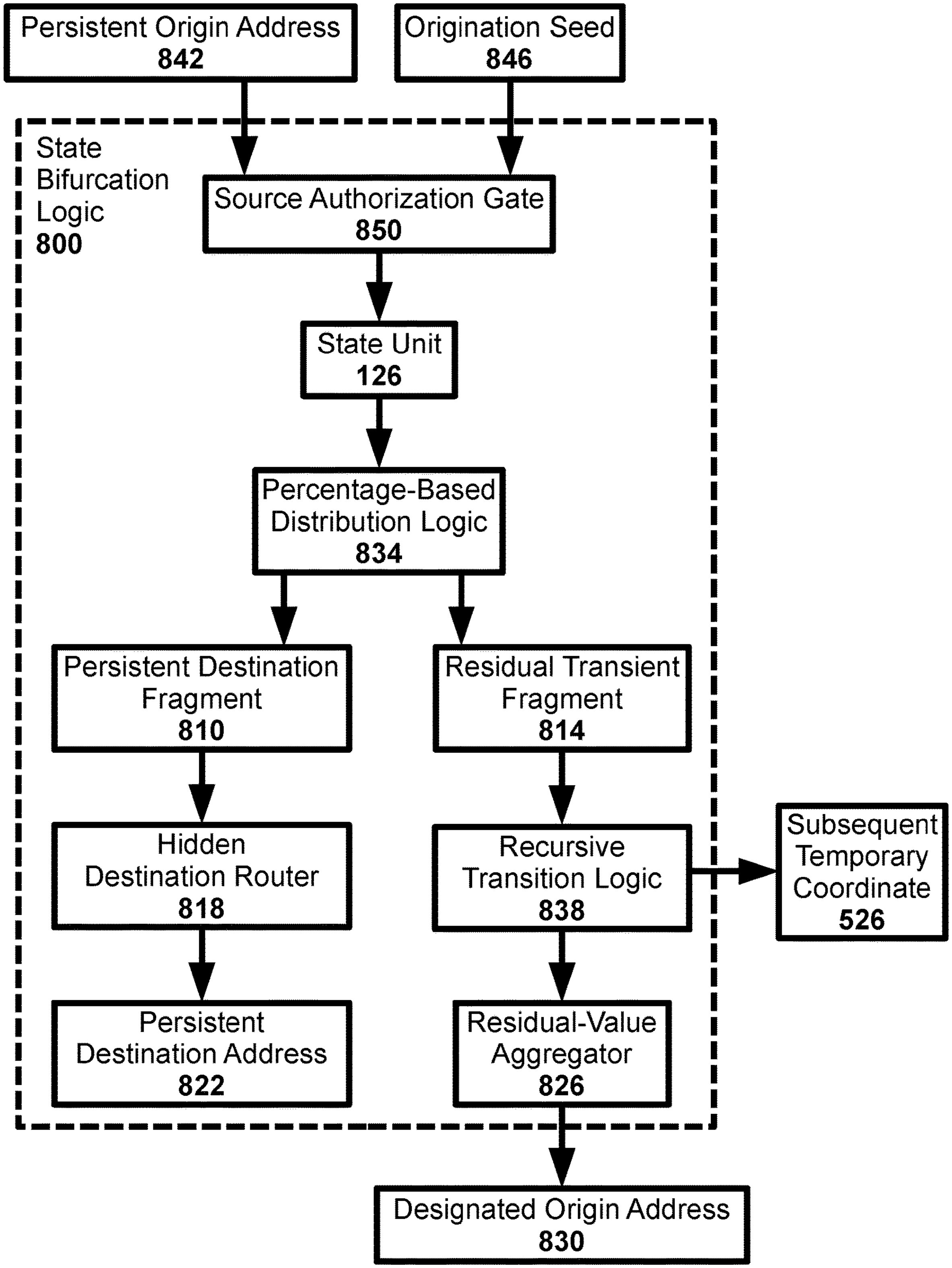
FIG. 8 is a functional block diagram illustrating the verification of an authorization source and the bifurcation of a state unit into persistent destination fragments and residual temporary coordinate fragments in accordance with the present disclosure.

Referring to FIG. 8, the State Bifurcation Logic 800 provides a specialized sub-assembly of the Transient Instruction Set 130 (see FIG. 1) configured for the automated division and routing of state units. The State Bifurcation Logic 800 is configured to perform a multi-path distribution of value within a single atomic update, utilizing a logic-splitter to divide a State Unit 126 into a Persistent Destination Fragment 810 and a Residual Transient Fragment 814. This assembly is governed by a Source Authorization Gate 850, which is a hardware-enforced logic module within the Payload Generator 110 (see FIG. 1) configured to verify the cryptographic lineage of a state unit against a Persistent Origin Address 842 or an Origination Seed 846 prior to authorizing the state division.

The division of state is orchestrated by Percentage-Based Distribution Logic 834, an execution routine that calculates the precise volume of the Persistent Destination Fragment 810 based on predefined parameters stored within the instruction set or retrieved via the Data Oracle Interface 134. Once calculated, the Persistent Destination Fragment 810 is routed to a Persistent Destination Address 822. To maintain cryptographic obscurity during the execution phase, the assembly may utilize a Hidden Destination Router 818, which is a logic gate within the transient instruction set configured to reveal the destination address only upon the successful adjustment of the state, preventing pre-emptive tracking of the transfer.

Simultaneously, the Residual Transient Fragment 814 is routed to a Subsequent Temporary Coordinate 526 (see FIG. 5) within a sequence. If the execution involves complex branching or multiple parallel paths, a Residual-Value Aggregator 826 is configured to sum the various residual fragments. During the final de-allocation phase of the payload, this aggregated value is automatically relocated to a Designated Origin Address 830, ensuring that no unspent state units remain sequestered within ephemeral coordinates. This process is further supported by Recursive Transition Logic 838, which is a logic routine within the bifurcation assembly configured to derive the subsequent coordinate from a cryptographic commitment, ensuring that the state transfer remains physically and logically bound to the mandatory de-allocation of the preceding coordinate.

In a practical application, this assembly functions as an automated tax withholding and verification system for decentralized freelance commerce. When a freelancer receives a payment, the Source Authorization Gate 850 verifies the Origination Seed 846 of the funds to ensure compliance with anti-money-laundering protocols. Following verification, the State Bifurcation Logic 800 automatically splits the payment: the Percentage-Based Distribution Logic 834 calculates the required tax obligation and routes the Persistent Destination Fragment 810 to a tax authority's permanent address, while the Residual Transient Fragment 814 continues to a temporary coordinate for further adjustment or final withdrawal. This ensures that legal compliance and source-verification are baked into the transaction logic at the hardware level before the persistent transfer is finalized. This high-level coordination of the birth and death of data objects shifts the technical focus to the specific internal structural boundaries of FIG. 9.

Figure 9:
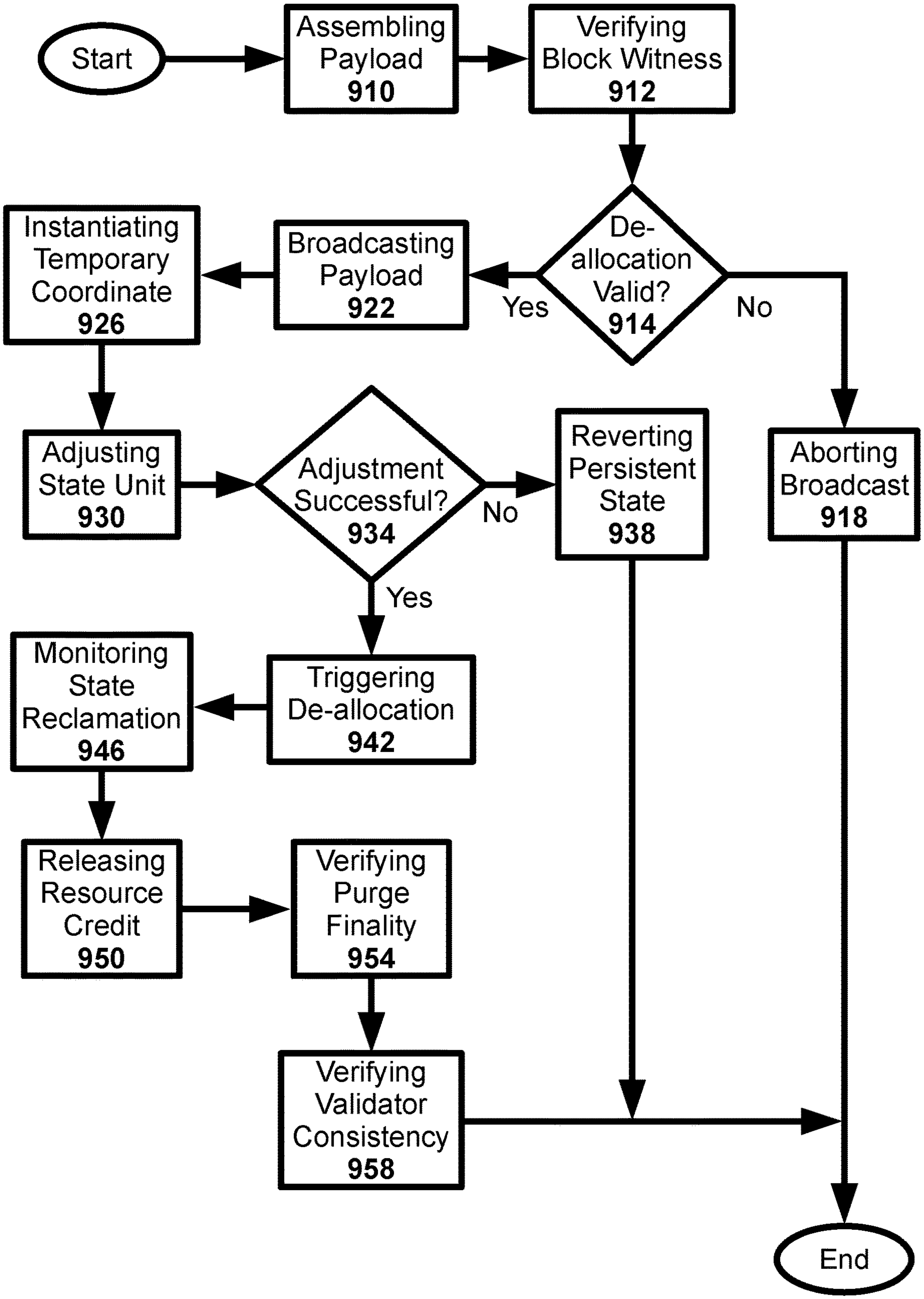
FIG. 9 is a logic flow diagram illustrating the chronological method for constructing, broadcasting, instantiating, and de-allocating state within a single atomic update in accordance with the present disclosure.

Referring to FIG. 9, the method for the automated minting and provenance anchoring of ephemeral assets provides a logic sequence for high-density state instantiation. Assembling at step 910 the Payload involves the Payload Generator 110 (see FIG. 1) building a symbiotic pair comprising a State Unit 126 (see FIG. 1) and its associated Transient Instruction Set 130 (see FIG. 1). During this build, a unique serial hash from the Origination Seed 846 (see FIG. 8) is mapped to the unit to establish its cryptographic lineage. Verifying at step 912 the Block Witness is a necessary check where the Temporal Witness Validator 442 (see FIG. 4) evaluates the current block height and network time to ensure the minting window remains open.

The process reaches a primary logical gate when Determining if a valid de-allocation instruction is present at step 914. At this point, the system scans the bytecode specifically for the Terminal De-allocation Instruction 230 (see FIG. 2). If that mandatory disposal logic is missing—meaning the asset would persist on the ledger indefinitely and cause state bloat—the system branches to Aborting at step 918 the Broadcast and terminates the network connection immediately. If the de-allocation logic is confirmed, the system branches to Broadcasting at step 922 the Payload, transmitting the data to the Decentralized Data Structure 118 (see FIG. 1).

Once the network ingests the payload, Instantiating at step 926 the Temporary Coordinate involves calculating a deterministic, one-time address in the Persistent State 140 (see FIG. 1) to serve as a transient execution chamber. Adjusting at step 930 the State Unit is the stage where the actual minting occurs, modifying the permissions of the unit while simultaneously committing a permanent Provenance Record 1424 (see FIG. 14) to the ledger so the asset origin remains verifiable.

The system then evaluates the operation during a Final check to see if the state adjustment was successful at step 934. Here, the execution engine determines if the minting cleared every security guard and technical requirement. If a conflict or failure is detected, the system branches to Reverting at step 938 the Persistent State, returning the ledger to its pre-transaction configuration. If the adjustment is verified, the system branches to Triggering at step 942 the De-allocation, where the Terminal De-allocation Instruction 230 (see FIG. 2) executes, physically removing the transient chamber and the disposable minting code from the Persistent State 140 (see FIG. 1).

Monitoring at step 946 the State Reclamation follows by confirming the deletion was finalized. Releasing at step 950 the Resource Credit then calculates the volume of reclaimed ledger space and allocates a gas refund or computational credit back into the System Memory 314 (see FIG. 3). Verifying at step 954 the Purge Finality confirms that the Stateless Identity Purge Routine 138 (see FIG. 1) successfully scrubbed the metadata, leaving the asset on the ledger while erasing the identity of the generator. Finally, Verifying at step 958 the Validator Consistency ensures the set of nodes authorizing the broadcast remained invariant until the de-allocation was confirmed.

In a practical application, this methodology enables the high-volume minting of millions of digital tickets. By utilizing the Origination Seed 846 (see FIG. 8), the system builds each ticket within a temporary room. Because the complex factory logic is contained within the Transient Instruction Set 130 (see FIG. 1), it exists only for the duration of the minting event. Once the ticket is transferred to a persistent destination address, the system excises the temporary environment and the minting code. This results in a clean, verifiable Provenance Record 1424 (see FIG. 14) for the ticket while ensuring zero state bloat from the creation logic. This high-level coordination of the birth and death of data objects shifts the technical focus to the specific internal structural boundaries of FIG. 10.

Figure 10:
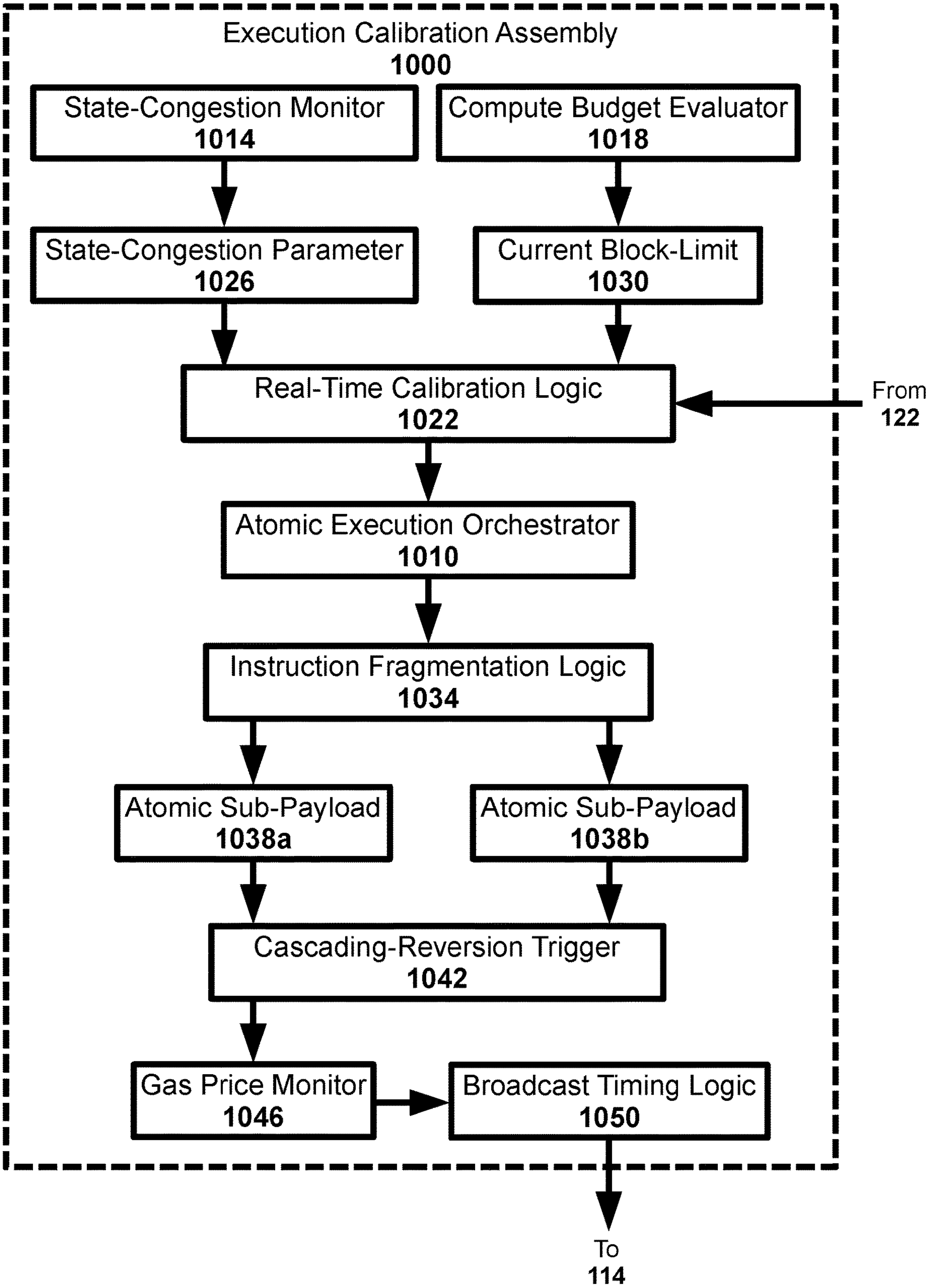
FIG. 10 is a functional block diagram of an execution engine illustrating the real-time calibration of payloads based on state-congestion and available compute budgets in accordance with the present disclosure.

Referring to FIG. 10, the Execution Calibration Assembly 1000 provides the hardware and logic framework for modulating payload execution during periods of high-network activity. While operating within the environment of the Decentralized Data Structure 118, the assembly 1000 is depicted as a discrete functional unit. The Atomic Execution Orchestrator 1010 serves as the primary engine of the assembly, sequencing the instantiation and de-allocation phases based on real-time environmental variables.

The assembly 1000 utilizes a State-Congestion Monitor 1014 to query real-time network load and derive a specific State-Congestion Parameter 1026. Simultaneously, a Compute Budget Evaluator 1018 assesses available processing limits relative to the Current-Block-Limit 1030. These values are ingested by the Real-Time Calibration Logic 1022, which determines if a Self-Terminating Payload 122 can be executed atomically within a single block or requires structural division.

If the compute requirements exceed the Current-Block-Limit 1030, the Instruction Fragmentation Logic 1034 is triggered to split the Transient Instruction Set 130 into a plurality of atomic sub-payloads, illustrated as Atomic Sub-Payload **1038*a* and Atomic Sub-Payload 1038*b*. Each sub-payload 1038*a*, 1038*b* maintains a functional dependency with the others, orchestrated by the Execution Sequencer 330 to ensure the state transition remains valid across successive blocks. In the event that a single dependency fails, a Cascading-Reversion Trigger 1042 is configured to initiate a reverting step of the Persistent State 140 for all related sub-payloads 1038*a*, 1038*b***.

Furthermore, the Execution Calibration Assembly 1000 includes a Gas Price Monitor 1046 configured to delay the broadcast of the Self-Terminating Payload 122 via the Communication Interface 114 until a predefined cost threshold is met. This is integrated with Broadcast Timing Logic 1050, which modulates the Execution Sequencer 330 based on a predicted state-reclamation credit. By aligning the broadcast with high-value de-allocation events, the system maximizes the economic recovery for the user.

In a practical application, the Execution Calibration Assembly 1000 acts as a stabilizer for the network during high-demand events, such as a mass-release of concert tickets. When millions of users attempt to interact with the network simultaneously, the State-Congestion Monitor 1014 detects the spike in occupancy. Rather than rejecting transactions that exceed the compute budget, the Instruction Fragmentation Logic 1034 breaks the ticket-purchase payload into smaller, manageable fragments, such as Atomic Sub-Payload 1038*a* and Atomic Sub-Payload 1038*b*, which are then slotted into the available space of consecutive blocks. Because each fragment includes its own de-allocation instructions, the network reclaims storage space immediately after each piece of the transaction finishes, preventing the persistent ledger from locking up under extreme load. This high-level coordination of resource consumption and state recovery shifts the technical focus to the specific internal structural boundaries of FIG. 11.

Figure 11:
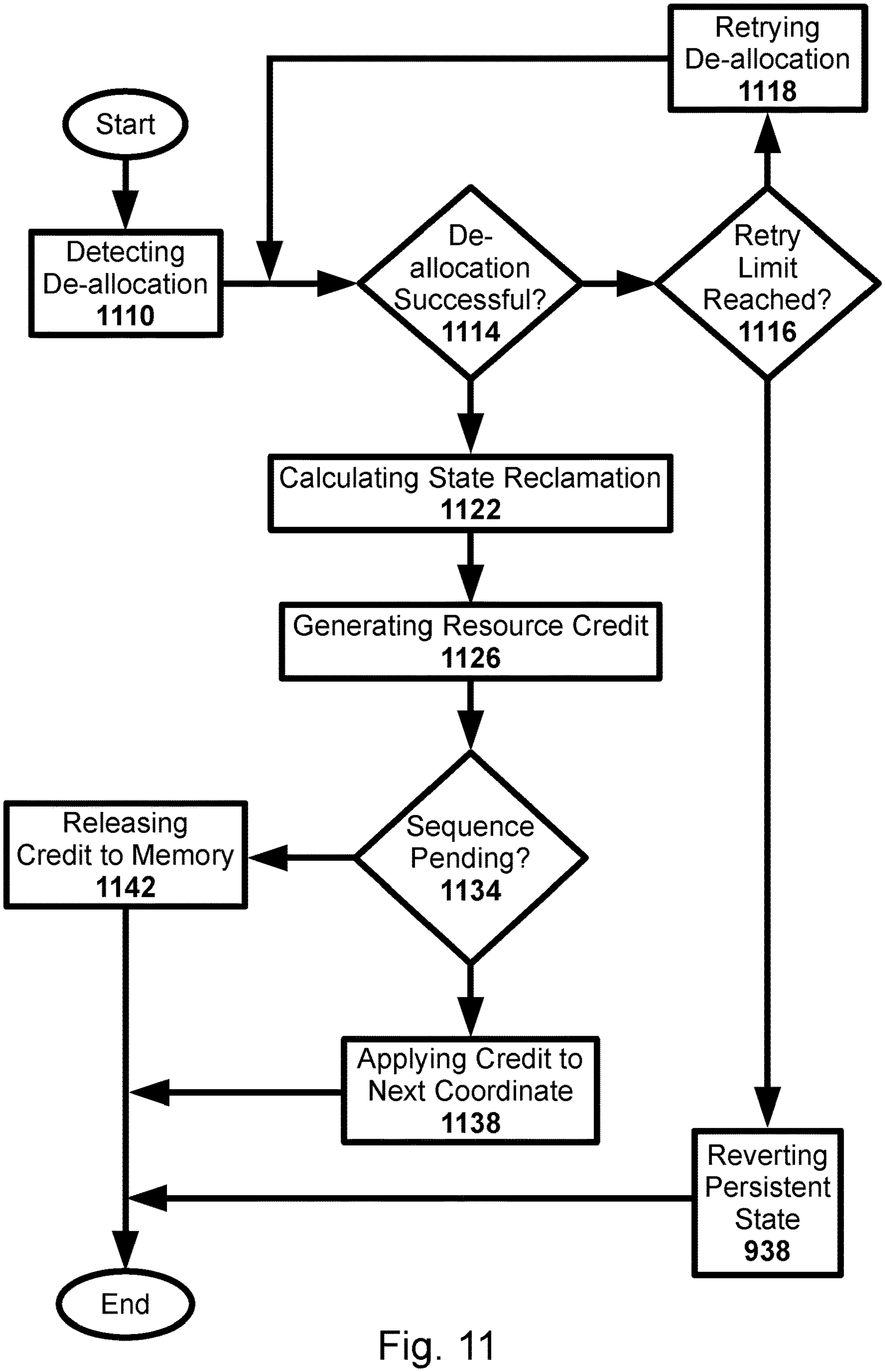
FIG. 11 is a logic flow diagram illustrating a state-reclamation process and the generation of resource credits resulting from coordinate de-allocation in accordance with the present disclosure.

Referring to FIG. 11, the method for issuing economic incentives through automated state maintenance provides a logic sequence for reclaiming network resources. Detecting at step 1110 a de-allocation event involves the Atomic Execution Orchestrator 1010 monitoring the Decentralized Data Structure 118 for the successful execution of a Terminal De-allocation Instruction 230. This trigger confirms that a temporary coordinate and its associated bytecode have reached the end of their functional lifecycle and are configured for physical excision.

The process reaches a primary decision point regarding the Verification of a successful state purge at step 1114. At this stage, the Atomic Execution Orchestrator 1010 determines if the temporary coordinate has been physically removed from the Persistent State 140. If a conflict or a resolvable state-lock prevents the deletion, the process branches to Determining at step 1116 if a Retry Limit has been reached. If the retry limit is reached, the process identifies a terminal execution failure and branches to an exception state, such as Reverting at step 938 the Persistent State, to ensure process finality. If the retry limit has not been reached, the process branches to Retrying at step 1118 the De-allocation, initiating a recursive logic loop that returns to the verification gate at step 1114.

If the purge is confirmed as successful at step 1114, the process branches to Calculating at step 1122 the State Reclamation, where the execution engine determines the exact volume of storage and compute resources released back to the network. Once the volume is quantified, Generating at step 1126 the Resource Credit involves deriving a specific asset, such as a gas refund, that is mathematically proportional to the reclaimed state footprint. This value serves as the economic reward for the user-initiated cleanup of the ledger.

The system then encounters a second logical gate to determine the Status of the current execution sequence at step 1134. This step identifies whether the user is in the middle of a multi-step transaction chain, such as a Sequence of Temporary Coordinates 510. If the user has a secondary task queued, the process branches to Applying at step 1138 the Credit to Next Coordinate, where the generated refund is used to immediately offset the instantiation cost of the Subsequent Temporary Coordinate 526. If no further sequence is pending, the process branches to Releasing at step 1142 the Credit to Memory, which allocates the final resource credit back to the System Memory 314 for use in future payload assemblies.

In a practical application, this methodology functions as an automated-cleanup bounty. For example, when a user completes a complex asset swap that utilized three temporary coordinates, the successful de-allocation of each coordinate triggers the calculation of a storage refund. Instead of the user paying the full cost for each step of the swap, the system uses the reclaimed resources from the first step to pay for the second. This automated-economic loop ensures that users are financially incentivized to use self-terminating payloads rather than permanent state, keeping the decentralized ledger fast and uncluttered without requiring manual intervention. This high-level coordination of the birth and death of data objects shifts the technical focus to the specific internal structural boundaries of FIG. 12.

Figure 12:
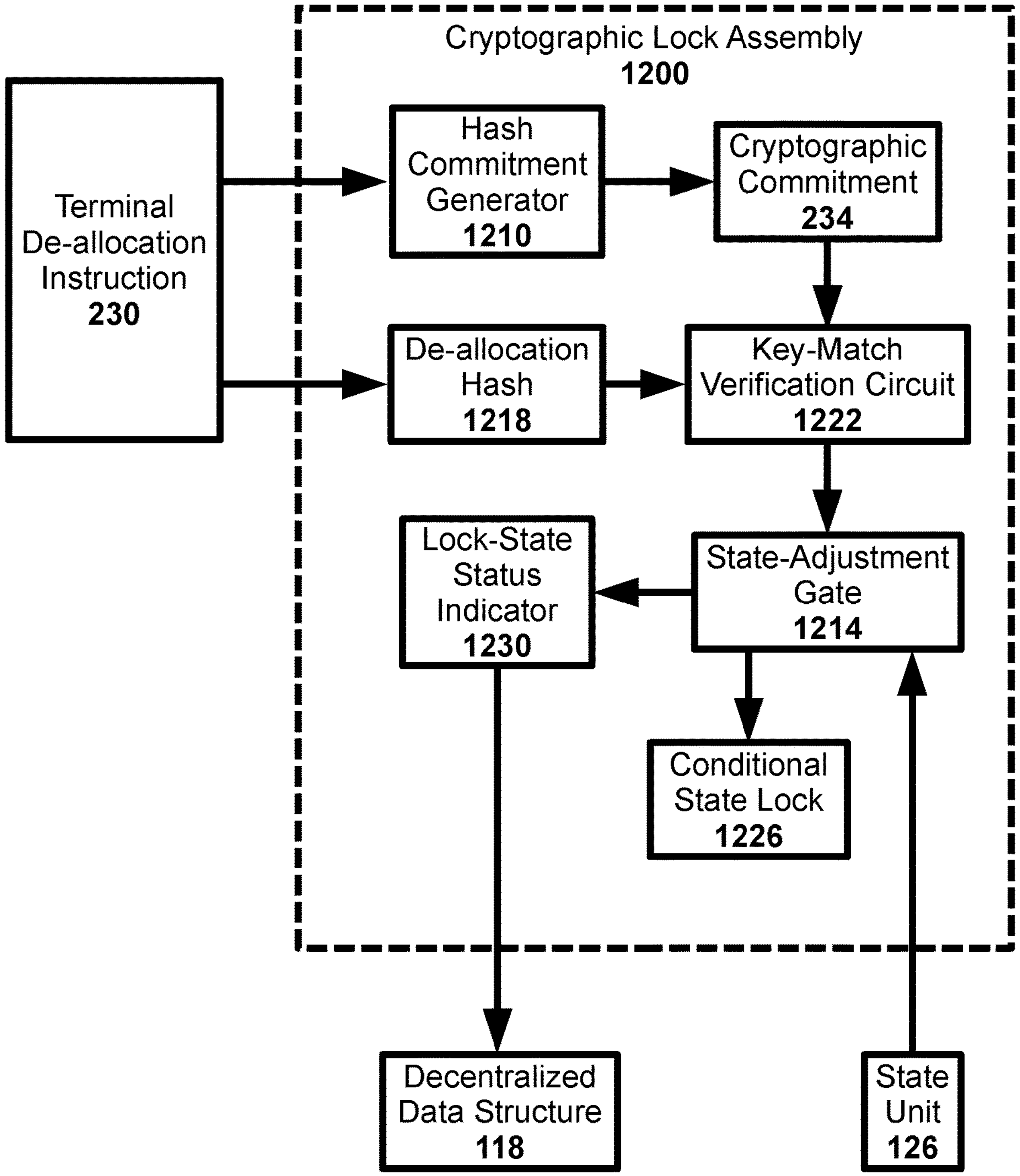
FIG. 12 is a functional block diagram illustrating a cryptographic lock mechanism between a state unit adjustment and a terminal de-allocation instruction in accordance with the present disclosure.

Referring to FIG. 12, the Cryptographic Lock Assembly 1200 provides an integrated structural framework for binding state adjustments to the mandatory execution of de-allocation logic. This assembly 1200 serves as a dead-man switch for sensitive state transitions, such as the issuance of a one-time-use administrative key or a temporary access-control adjustment, ensuring that the asset is obliterated immediately following its utilization.

The process begins with the Hash Commitment Generator 1210, which derives a Cryptographic Commitment 234 (see FIG. 2) directly from the Terminal De-allocation Instruction 230. This Cryptographic Commitment 234 essentially acts as a pre-image lock. Simultaneously, the State-Adjustment Gate 1214 applies a Conditional State Lock 1226 to the State Unit 126. This State-Adjustment Gate 1214 prevents the state transition—such as the activation of a temporary password—from reaching persistent finality on the Decentralized Data Structure 118 (see FIG. 1) unless a valid resolution key is provided.

During the atomic update, the execution engine generates a De-allocation Hash 1218 from the provided de-allocation opcode. The Key-Match Verification Circuit 1222 then compares the De-allocation Hash 1218 against the Cryptographic Commitment 234 (see FIG. 2) stored within the Cryptographic Envelope 210 (see FIG. 2). If the Key-Match Verification Circuit 1222 confirms a match, the State-Adjustment Gate 1214 is released, allowing the adjustment to occur. Crucially, because the key to unlock the state is the Terminal De-allocation Instruction 230 itself, the system is inhibited from authorizing the state's birth without simultaneously executing its death.

The active status of this mechanism is tracked via the Lock-State Status Indicator 1230 in the payload header. If the Terminal De-allocation Instruction 230 is absent or if the Cryptographic Commitment 234 fails the Hash-Commitment Check 434 (see FIG. 4) within the Secure Execution Environment 410 (see FIG. 4), the entire transaction is rejected. This ensures that a sensitive State Unit 126 is restricted from existing within the Persistent State 140 (see FIG. 1) for more than a single atomic cycle.

In a practical application, the Cryptographic Lock Assembly 1200 functions as a high-security administrative override. For instance, if a network engineer requires a one-time access key to modify a system configuration, the Payload Generator 110 (see FIG. 1) constructs a Self-Terminating Payload 122 where the access key is the State Unit 126. The Cryptographic Lock Assembly 1200 ensures that the key only becomes active if the Terminal De-allocation Instruction 230—the code that wipes the key from the ledger—is cryptographically bound to the activation logic. Once the engineer uses the key, the switch is triggered, the key is purged, and the Provenance Record 1424 (see FIG. 14) is written to prove the access occurred, leaving zero state bloat or security residue on the network. This high-level coordination of birth and death shifts the technical focus to the specific internal structural boundaries of FIG. 13.

Figure 13:
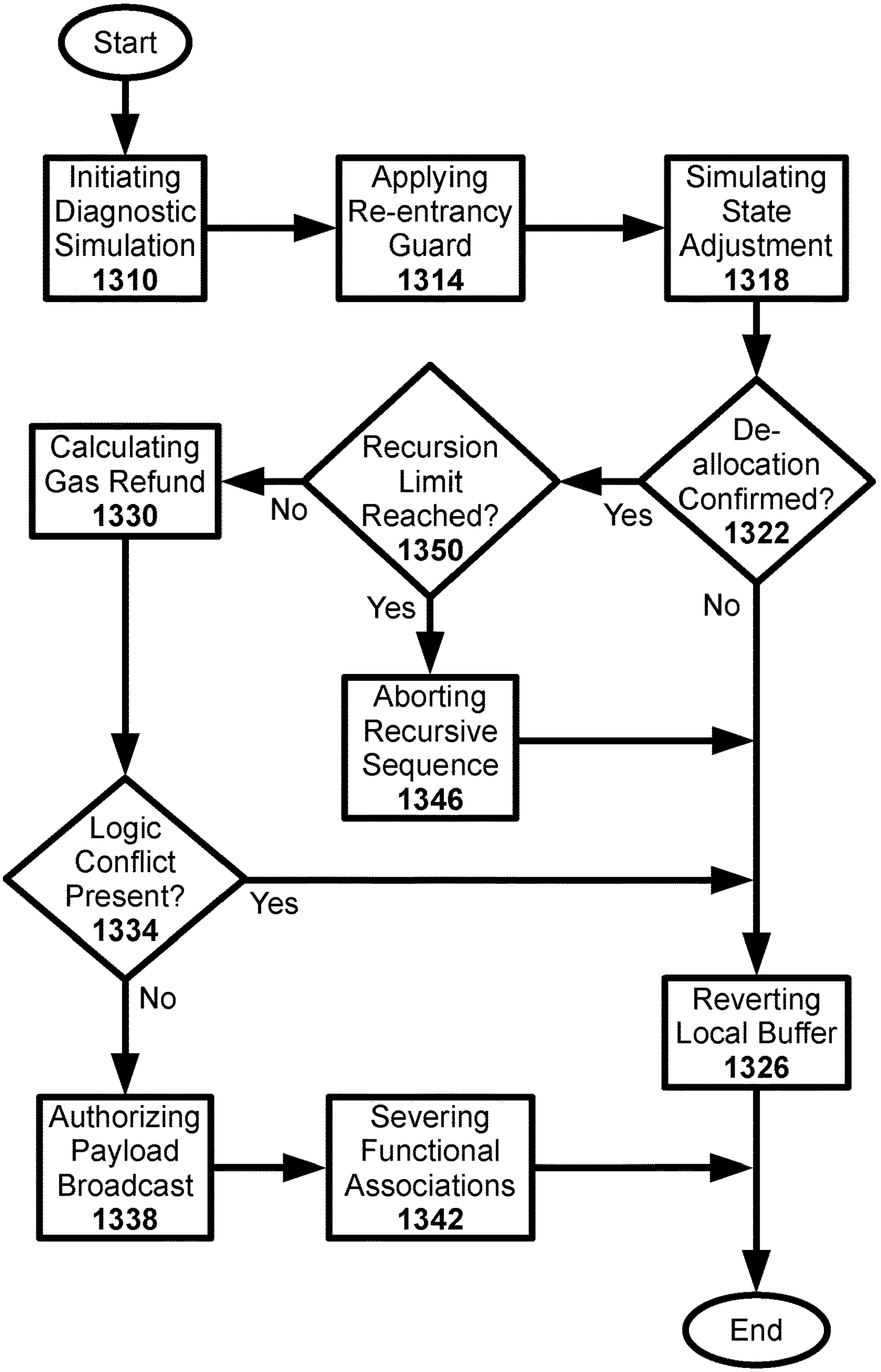
FIG. 13 is a logic flow diagram illustrating the simulation of an atomic update in a local execution environment and the verification of a re-entrancy-guard prior to broadcast in accordance with the present disclosure.

Referring to FIG. 13, the method for performing a local simulation of enterprise-level data migrations is configured to provide operational security before public network exposure. Initiating at step 1310 a diagnostic simulation involves the Payload Generator 110 (see FIG. 1) triggering an off-chain execution of the payload within the Local Execution Environment 338 (see FIG. 3). This sandboxed staging area allows the system to test complex transitions without risking actual gas fees or ledger corruption.

Applying at step 1314 a Re-entrancy-Guard comprises instantiating a logical lock within the sandbox to ensure no external calls can modify the State Unit 126 (see FIG. 1) during the trial run. Once isolated, Simulating at step 1318 the State Adjustment involves executing the Transient Instruction Set 130 (see FIG. 1) against the Local State Buffer 334 (see FIG. 3), which contains a mirrored copy of the current persistent ledger state.

The method then evaluates the simulation results at a logical juncture regarding whether the de-allocation is confirmed at step 1322. At this point, the system determines if the local execution resulted in a clean purge of the temporary coordinate. If a de-allocation event failure occurs—indicating a potential memory leak or logic error—the process branches to Reverting at step 1326 the Local Buffer to discard the failed simulation. Conversely, if the simulated de-allocation initiates a recursive sequence that exceeds a predefined depth limit, the method proceeds to Aborting at step 1346 the Recursive Sequence. This terminal step ensures process finality by halting the sequence before it can exhaust the resources defined in the Recursion-Depth Limit 626 (see FIG. 6), subsequently feeding into the Reverting step 1326 to clear the buffer.

If the purge is confirmed and within limits, the process branches to Calculating at step 1330 the Gas Refund, where the engine derives the precise value of reclaimed resources expected from the real-world de-allocation event. The system then performs a second critical check to determine if a logic-conflict is present at step 1334. This step looks for collisions between the proposed instruction set and the existing rules of the Persistent State 140 (see FIG. 1). If a logic-conflict is present, the process branches back to Reverting at step 1326 the Local Buffer to prevent a flawed broadcast.

If the simulation is entirely clear of conflicts, the process branches to Authorizing at step 1338 the Payload Broadcast, which finalizes the payload for transmission via the Communication Interface 114 (see FIG. 1). Finally, Severing at step 1342 the Functional Associations involves configuring the Communication Interface 114 to terminate the network socket session immediately following the broadcast to facilitate agent decoupling.

In a practical application, this pre-flight verification acts as a risk-mitigation tool for large-scale migrations. For an enterprise moving massive datasets, a single logic error in a de-allocation instruction could result in thousands of dollars in wasted gas fees on a public ledger. By running the migration through the Local Execution Environment 338 first, the company can catch re-entrancy risks, "hanging" coordinates, or infinite recursion depths via step 1346. Only when the Local State Buffer 334 confirms a perfect execution and a predicted state-reclamation credit does the system permit the broadcast to the Decentralized Data Structure 118. This coordination of local and public state shifts the technical focus to the specific internal structural boundaries of FIG. 14.

Figure 14:
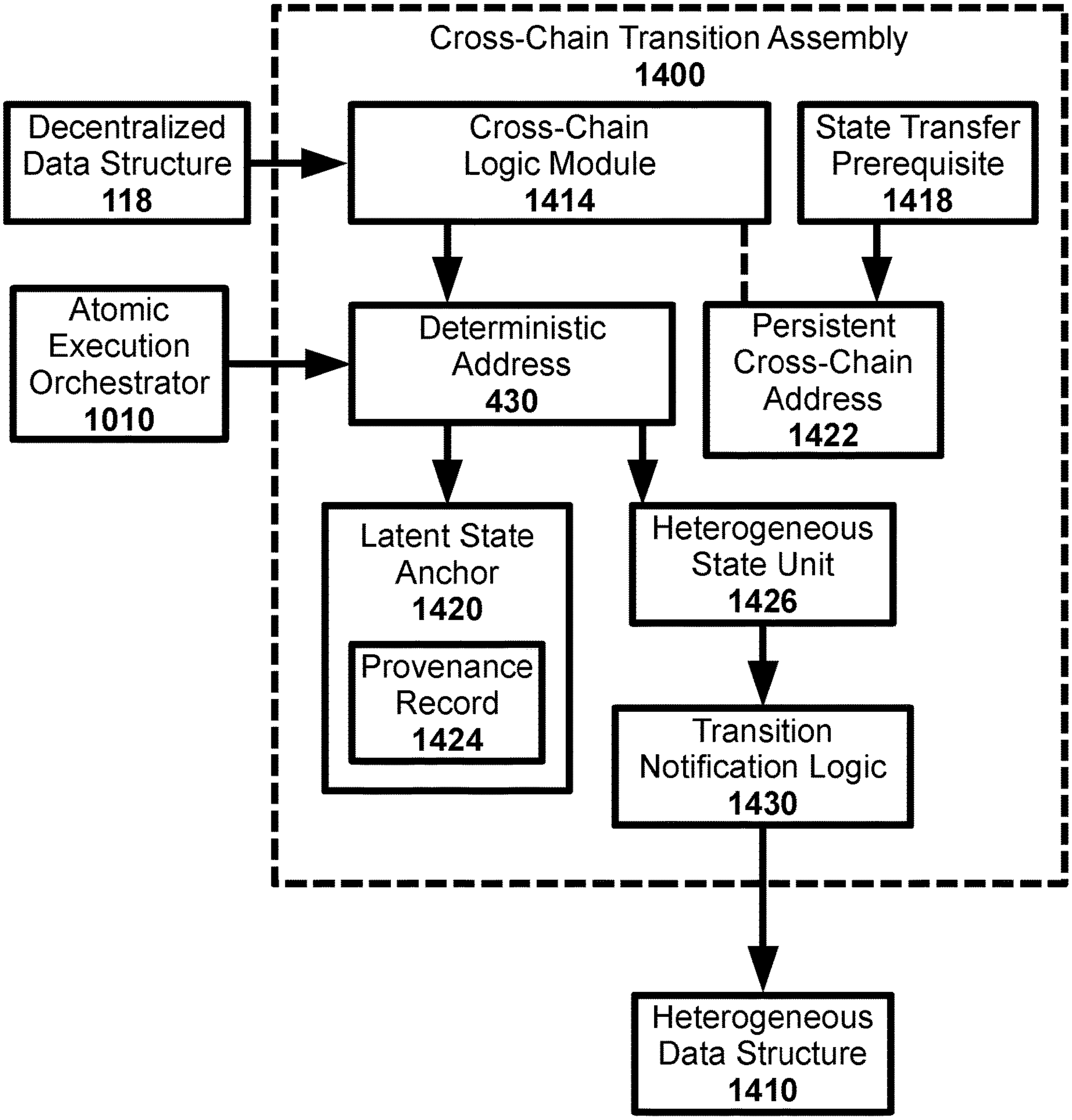
FIG. 14 is a functional block diagram illustrating a cross-chain state transition where a persistent destination address resides on a heterogeneous data structure in accordance with the present disclosure.

Referring to FIG. 14, the Cross-Chain Transition Assembly 1400 provides an integrated framework for executing state transfers between non-homogeneous decentralized data structures. This assembly is configured to address vulnerabilities in traditional blockchain bridging by reducing or removing the requirement for a permanent liquidity vault on the origin chain. Value is moved from a primary Decentralized Data Structure 118 (see FIG. 1) to a Heterogeneous Data Structure 1410 without leaving a persistent target for exploitation.

The process is managed by a Cross-Chain Logic Module 1414, which is a specialized sub-assembly of the Transient Instruction Set 130 (see FIG. 1). This module is configured to translate the data format of a State Unit 126 (see FIG. 1) into a Heterogeneous State Unit 1426 compatible with the secondary protocol. During the transition, the asset is temporarily hosted at a Deterministic Address 430 (see FIG. 4) on the origin chain, which serves as a transient bridge vault.

A State Transfer Prerequisite 1418 acts as a mandatory validation condition, requiring proof that the asset has been successfully instantiated at the Persistent Cross-Chain Address 1422 before the origin state can be finalized. Once this condition is met, the Atomic Execution Orchestrator 1010 (see FIG. 10) triggers the Terminal De-allocation Instruction 230 (see FIG. 2). This action purges the Deterministic Address 430 on the origin chain, effectively destroying the bridge vault after its single-use.

The Transition Notification Logic 1430 then generates an encrypted signal for the destination address holder to confirm the arrival of the funds. Because the origin address is de-allocated, there is no permanent persistent target of sequestered assets for attackers to target. Furthermore, a Provenance Record 1424 is generated and stored via the Latent State Anchor 1420 to provide a verifiable history of the state unit lineage even after the bytecode has been purged. The Latent State Anchor 1420 serves as the cryptographic specification for authorizing the state unit 126 and verifying the genetic map of the disposable bytecode.

In a practical application, this assembly allows a user to move assets from a primary network to a secondary network with zero-footprint finality. For example, when moving value from a primary ledger to a secondary heterogeneous ledger, the bridge vault only exists for the duration of the atomic update. Once the Heterogeneous State Unit 1426 is confirmed on the destination side, the origin vault is obliterated from the Persistent State 140 (see FIG. 1). This high-level coordination of cross-chain format translation and immediate resource reclamation ensures that the network remains secure and lean, concluding the detailed functional breakdown of the decentralized state management environment.

In light of the foregoing descriptions, the present disclosure provides a technical solution for minimizing state bloat and enhancing cryptographic security through the use of self-terminating transient payloads. While the exemplary embodiments have been described with reference to a decentralized data structure 118, the architecture of the Decentralized State Management Environment 100 is fundamentally agnostic to the underlying protocol layer. It is expressly contemplated that the physical instantiation and de-allocation of temporary coordinates may be implemented within Layer-2 (L2) scaling solutions, such as Optimistic Rollups or Zero-Knowledge (ZK) Rollups. In such an embodiment, the "single atomic update" occurs within the sequestered execution environment of the rollup's sequencer or prover logic, where the birth and death of the temporary coordinates 430 are committed to the Layer-1 (L1) anchor only as a final, compressed state-root. This ensures that the intermediate logic-branching and bifurcation of state units remain entirely off-chain, further reducing the computational footprint of the persistent ledger.

Furthermore, the hardware and logic boundaries described herein—specifically regarding the Payload Generator 110 and the Execution Calibration Assembly 1000—may be adapted for use in diverse hardware environments ranging from high-performance validator clusters to resource-constrained Internet-of-Things (IoT) devices. For example, a mobile device housing a Secure Processing Environment (SPE) or Trusted Execution Environment (TEE) may function as the physical substrate for the Local Execution Environment 338, enabling the staging of complex state transitions without exposing the user's long-term identity or asset balances to the broader network. In such alternate embodiments, the Stateless Identity Purge Routine 138 may be integrated with hardware-level biometric or peripheral-authentication signals to ensure that the "destruction" of the payload logic is physically bound to the termination of the device's volatile memory session. Additionally, the environment may be implemented within automated gateway systems for secure physical access control, wherein the de-allocation of a temporary coordinate is triggered by the successful confirmation of a hardware handover event or a sensor-based proximity witness.

The scope of the disclosure is not limited to financial transactions but extends to any hardware-mediated state transition requiring ephemeral verification, such as decentralized identity (DID) verification, supply chain provenance tracking, or secure multi-party computation (MPC). Specific operating environments include interoperability bridges where the de-allocation of intermediate logic modules prevents the formation of persistent liquidity honeypots, and regulatory compliance systems where identity metadata is verified via origination seeds and immediately purged to ensure zero-knowledge storage compliance. The specific structural configurations shown in the figures, such as the bifurcation logic and the branching hierarchies, are intended to be illustrative rather than exhaustive. For instance, the system may be utilized in gaming environments for the ephemeral management of entity permissions that de-spawn automatically to reclaim state rent, or in high-frequency trading environments where entropy-injected coordinates mask institutional order metadata. A person of ordinary skill in the art will recognize that the sequence of birth, adjustment, and death of data objects described herein can be parallelized, nested, or distributed across heterogeneous networks (L0, L1, and L2) to achieve varied balances between latency, cost-recovery, and cryptographic obscurity. Accordingly, the detailed description is intended to be exemplary, and the technical focus remains on the structural coordination of state units within the lifecycle of a self-terminating payload.

The system and method enable the instantiation of a sequence of temporary coordinates where state units are adjusted and coordinates are de-allocated within a single atomic update. This sequential flow allows for the dynamic derivation of subsequent coordinates based on the results of preceding adjustments. As the payload progresses through this sequence, it is configured to prune completed instructions and compress administrative metadata to reduce the overall data footprint. This monotonic decrease in data size facilitates the reclamation of gas refunds at each step. In certain embodiments, a subset of instructions is truncated only upon successful de-allocation, ensuring that the payload remains lean while maintaining execution integrity.

State management involves the bifurcation of state units at temporary coordinates to transfer portions to persistent destination addresses while routing residuals to subsequent coordinates. These persistent addresses can be cryptographically hidden, revealed only at the moment of adjustment. The de-allocation of preceding coordinates in a sequence generates resource credits that are applied to offset the costs of subsequent instantiations. Following a complex bifurcation, the system can aggregate residual values and automatically relocate them to a designated origin address. This lifecycle is further supported by monitoring state reclamation events to release resource credits for future payload assemblies.

The architecture enforces a strict cryptographic lock between state adjustment and successful de-allocation via hash commitments. These commitments are only resolvable upon the inclusion of a specific de-allocation opcode within the atomic update. The resulting data object is characterized by a terminal state, rendering the instruction set inoperable or expired immediately following de-allocation. This purge of coordinates and instructions from persistent state constitutes an automated reclamation process. Functional dependencies are enforced to require de-allocation instructions as a prerequisite for transmission, ensuring that the payload severs associations as a stateless agent immediately following broadcast.

Temporary coordinates are implemented as deterministic addresses derived from hashes of the transient instruction set. This derivation can involve one-way cryptographic functions combined with validator-specific entropy to ensure a statistical distribution that appears random to external observers. Access is further restricted by validating block-specific witnesses or cross-referencing median-time-past parameters to anchor execution to a precise temporal window or block height. Within this environment, state units—such as access-control permissions—may be restricted to a temporary execution environment for the duration of the atomic update.

At the point of origination, the payload generator links the state unit to a verified authorization source prior to final assembly. This source logic allows for the sequestration of pre-existing state balances from persistent origin addresses or the creation of entirely new units derived from an origination seed. This process is governed by latent state anchors stored within the data structure, which serve as cryptographic templates defining the necessary authorization parameters. The instruction set acts as disposable bytecode to execute a one-time origination event; while this event remains verifiable against the anchor's template, the bytecode itself is purged upon coordinate de-allocation to prevent logic bloat. Authentication is achieved through digital signatures mapped to these anchor parameters, ensuring that state adjustments are only enabled for verified payloads. Post-execution, the system generates a permanent provenance record that persists beyond the lifecycle of the temporary coordinate, providing a definitive audit trail for the state unit's lineage.

Payload generation involves the encapsulation of data within cryptographic envelopes, such as multi-signature containers requiring both validator and generator signatures. Prior to broadcast, the system may retrieve instructions from a pre-validated template library or populate templates with parameters from off-chain data oracles. To ensure local security, state units are encrypted within volatile memory buffers or memory allocations during assembly. The system further validates the presence of terminal de-allocation requirements and cryptographic integrity as a mandatory prerequisite for network transmission.

The system dynamically calibrates execution based on real-time state-congestion parameters and available compute budgets. If compute requirements exceed a current-block-limit, the instruction set is fragmented into atomic sub-payloads that maintain strict functional dependencies. Logic integrity is protected by re-entrancy-guards that prevent external calls from modifying state during the update. In the event of a de-allocation failure or state-conflict, the execution engine triggers a cascading reversion to return the persistent state to its pre-transaction configuration. Monitoring gas prices allows the system to delay broadcasts until predefined cost thresholds are met.

Advanced embodiments utilize off-chain diagnostic simulations to identify potential logic conflicts and calculate precise gas refund values prior to broadcast. These simulations verify de-allocation in a local environment to prevent failed transactions on the ledger. The system also supports cross-chain state transitions where persistent destination addresses reside on heterogeneous data structures. Upon successful transition or adjustment, encrypted notifications are generated for specific key holders. Finally, the system enforces recursion-depth limits to prevent excessive coordinate instantiation, while allowing for recursive-latent transitions through cryptographic commitments to subsequent instruction sets.

Having described the technical architecture and functional logic of the present disclosure in detail, it is intended that the scope of the disclosure be defined by the claims appended hereto, and that all modifications, equivalents, and variations that fall within the spirit and scope of the disclosure be included therein. The use of specific terminology and numbering is intended to provide clarity and does not preclude the application of the broadest reasonable interpretation of the elements as defined in the summary, the introductory definitions, and the specific embodiments described herein.

Although the disclosure has been shown and described with respect to certain aspects or embodiments, equivalent alterations and modifications will occur to others skilled in the art upon the reading and understanding of this specification and the annexed drawings. In particular regard to the various functions performed by the above-described items referred to by numerals (components, assemblies, modules, etc.), the terms (including a reference to a "means") used to describe such items are intended to correspond, unless otherwise indicated, to any item which performs the specified function of the described item (e.g., that is functionally equivalent), even though not structurally equivalent to any exemplary structure which performs the function in the herein illustrated exemplary aspects of the disclosure. Such items shall be understood to include any combination of hardware, firmware, or machine-executable instructions (software) configured to perform the recited functions.

In addition, while a particular feature of the disclosure may have been described above with respect to only one of several illustrated aspects, such feature may be combined with one or more other features of the other aspects, as may be desired and advantageous for any given or particular application. The use of the singular "a" or "an" is intended to include the plural "one or more" unless specifically stated otherwise.

The description herein with reference to the figures describes the present disclosure in sufficient detail to enable one skilled in the art to utilize the present disclosure in a variety of applications and devices. It will be readily apparent that various changes and modifications could be made therein without departing from the spirit and scope of the disclosure as defined in the following claims.

I claim:

1. A system for decentralized state management, the system comprising:
- a payload generator configured to assemble a payload comprising a state unit and a transient instruction set;
- the transient instruction set including execution logic to instantiate a temporary coordinate, adjust the state unit via the temporary coordinate, and trigger a de-allocation of the temporary coordinate from a persistent state; and
- a communication interface to broadcast the payload to a decentralized data structure;

wherein the payload is configured to require the instantiation, adjustment, and de-allocation to occur within a single atomic update of the decentralized data structure.

2. The system of claim 1, wherein the transient instruction set is configured to instantiate a sequence of temporary coordinates, adjust the state unit at each coordinate in the sequence, and de-allocate each temporary coordinate within the single atomic update.

3. The system of claim 2, wherein the transient instruction set is configured to prune completed instructions from the payload at each temporary coordinate in the sequence, such that the payload decreases in data size as it progresses through the sequence.

4. The system of claim 2, wherein the transient instruction set is configured to bifurcate the state unit at each temporary coordinate in the sequence, transferring a portion of the state unit to a persistent destination address and the remainder to a subsequent temporary coordinate in the sequence.

5. The system of claim 4, wherein the de-allocation of a preceding temporary coordinate in the sequence generates a resource credit applicable to the instantiation of a subsequent temporary coordinate in the sequence.

6. The system of claim 2, wherein the sequence comprises a branching hierarchy of temporary coordinates, and the transient instruction set is configured to parallelize the adjustment of multiple state units across the branching hierarchy within the single atomic update.

7. The system of claim 1, wherein the payload is cryptographically configured to lock the adjustment of the state unit to the successful execution of the de-allocation of the temporary coordinate.

8. The system of claim 7, wherein the cryptographic configuration of the payload comprises a hash commitment and a de-allocation instruction, the hash commitment being only resolvable upon the inclusion of the de-allocation instruction within the single atomic update.

9. The system of claim 1, wherein the temporary coordinate is a deterministic address derived from a hash of the transient instruction set, such that the state unit is inhibited from access by logic external to the execution logic.

10. The system of claim 9, wherein the deterministic address is derived via a one-way cryptographic function of the transient instruction set combined with a validator-specific entropy value to configure the temporary coordinate to exhibit a statistical distribution of a random value to external observers.

11. The system of claim 10, wherein the transient instruction set is configured to validate a block-specific witness prior to the adjustment, such that the temporary coordinate is only accessible within a specific block height of the decentralized data structure.

12. The system of claim 1, wherein the transient instruction set is configured as an ephemeral bytecode fragment that becomes functionally invalid immediately following the single atomic update.

13. The system of claim 1, wherein the state unit comprises an access-control permission, and the adjustment of the state unit via the temporary coordinate comprises a restriction of said access-control permission to a temporary execution environment.

14. The system of claim 1, wherein the single atomic update is configured as a conditional state transition such that the instantiation of the temporary coordinate is contingent upon a pre-validated de-allocation instruction within the transient instruction set.

15. The system of claim 14, wherein the execution engine is configured to revert the persistent state to a pre-transaction configuration if a failure of the de-allocation of the temporary coordinate occurs from a state-conflict within the single atomic update.

16. The system of claim 1, wherein the transient instruction set is configured to transfer the state unit to a persistent destination address prior to the de-allocation of the temporary coordinate.

17. The system of claim 16, wherein the persistent destination address resides on a heterogeneous data structure, and the transient instruction set is configured to trigger a cross-chain state transition as the prerequisite for the de-allocation.

18. The system of claim 1, wherein the payload generator comprises a source authorization gate configured to link the state unit to an authorization source prior to assembly, wherein the authorization source comprises at least one of a persistent origin address providing a pre-existing state balance to be sequestered into the temporary coordinate, and an origination seed configured to authorize the creation of a new state unit within the temporary coordinate.

19. The system of claim 18, wherein the authorization source comprises a latent state anchor stored on the decentralized data structure, the latent state anchor defining a cryptographic template and a set of authorization parameters for the state unit.

20. The system of claim 19, wherein the transient instruction set is configured as disposable bytecode that executes a one-time origination event tied to the latent state anchor, such that the origination event is verifiable against the cryptographic template but the disposable bytecode is purged from the persistent state upon the de-allocation of the temporary coordinate.

21. A system for decentralized state management, the system comprising:

a processor and a memory storing instructions that, when executed by the processor, configure the system to:

assemble a payload comprising a state unit and a transient instruction set;

configure the transient instruction set to instantiate a temporary coordinate, adjust the state unit via the temporary coordinate, and trigger a de-allocation of the temporary coordinate from a persistent state; and broadcast the payload to a decentralized data structure;

whereby the payload is configured to require the instantiation, adjustment, and de-allocation to occur within a single atomic update of the decentralized data structure.

22. The system of claim 21, wherein the instructions further configure the system to calculate the temporary coordinate as a deterministic address derived from a hash of the transient instruction set within a secure-execution environment of the processor.

23. The system of claim 21, wherein the instructions further configure the system to monitor for a successful state reclamation event following the broadcast and, upon detection, release a resource credit to the memory for a subsequent payload assembly.

24. The system of claim 21, wherein the instructions further configure the processor to query a current-block-limit of the decentralized data structure and fragment the transient instruction set into a plurality of atomic sub-payloads if the compute requirement exceeds a predefined threshold of the current-block-limit.

25. A system for state-optimized data transfer, the system comprising:

a processor and a memory storing an execution engine that, when executed by the processor, configure the system to:

output a payload comprising a state unit and a transient instruction set;

configure the transient instruction set to instantiate a temporary coordinate, adjust the state unit via the temporary coordinate, and trigger a de-allocation of the temporary coordinate from a persistent state; and a network interface to broadcast the payload to a decentralized data structure;

whereby the execution engine is configured to trigger the instantiation, adjustment, and de-allocation within a single atomic update of the decentralized data structure.

26. The system of claim 25, wherein the payload is a self-terminating payload such that the transient instruction set is rendered inoperable upon the de-allocation of the temporary coordinate.

27. The system of claim 25, wherein the execution engine is configured to cryptographically bind the state unit to the transient instruction set to require the execution of the de-allocation to enable access to the state unit.

28. The system of claim 25, wherein the execution engine is configured to verify a validator-set consistency, such that the single-atomic-update is only executed if the set of nodes authorizing the broadcast remains invariant until the de-allocation of the temporary coordinate.

29. A non-transitory computer-readable medium storing instructions that, when executed by a processor, configure the processor to:

assemble a payload comprising a state unit and a transient instruction set;

configure the transient instruction set to instantiate a temporary coordinate, adjust the state unit via the temporary coordinate, and trigger a de-allocation of the temporary coordinate from a persistent state; and broadcast the payload to a decentralized data structure;

whereby the payload is configured to require the instantiation, adjustment, and de-allocation to occur within a single atomic update of the decentralized data structure.

30. The medium of claim 29, wherein the instructions further configure the processor to perform an off-chain diagnostic simulation of the single atomic-update to calculate a precise gas refund value before the broadcast.

* * * * *